(12) United States Patent
Wade et al.

(10) Patent No.: US 9,892,293 B1
(45) Date of Patent: Feb. 13, 2018

(54) TAMPER DETECTION SYSTEM

(71) Applicant: Square, Inc., San Francisco, CA (US)

(72) Inventors: Jeremy Wade, San Francisco, CA (US); Sean Michael Hafemann, Lafayette, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/382,165

(22) Filed: Dec. 16, 2016

(51) Int. Cl.
*G06K 19/00* (2006.01)
*G06K 7/10* (2006.01)

(52) U.S. Cl.
CPC .................. *G06K 7/10277* (2013.01)

(58) Field of Classification Search
USPC ................... 235/435, 439, 451, 487, 492
See application file for complete search history.

(56) References Cited

U.S. PATENT DOCUMENTS 7,343,496 B1 * 3/2008 Hsiang .................. G06F 21/572
 257/922
7,837,110 B1 * 11/2010 Hess ........................ G06K 7/08
 235/449

* cited by examiner

*Primary Examiner* — Matthew Mikels
(74) *Attorney, Agent, or Firm* — Lee & Hayes, PLLC

(57) ABSTRACT

Disclosed is a technique for prevention of false tamper positives experienced by an electronic device by use of a custom profile. The technique includes application of sensors of the device to collect data from the environment. Further, the device determines whether an event causes accidental triggering of tamper response as the environmental data varies. Accordingly, the conditions triggering a tamper response are dynamically changed as the environmental data changes.

28 Claims, 12 Drawing Sheets

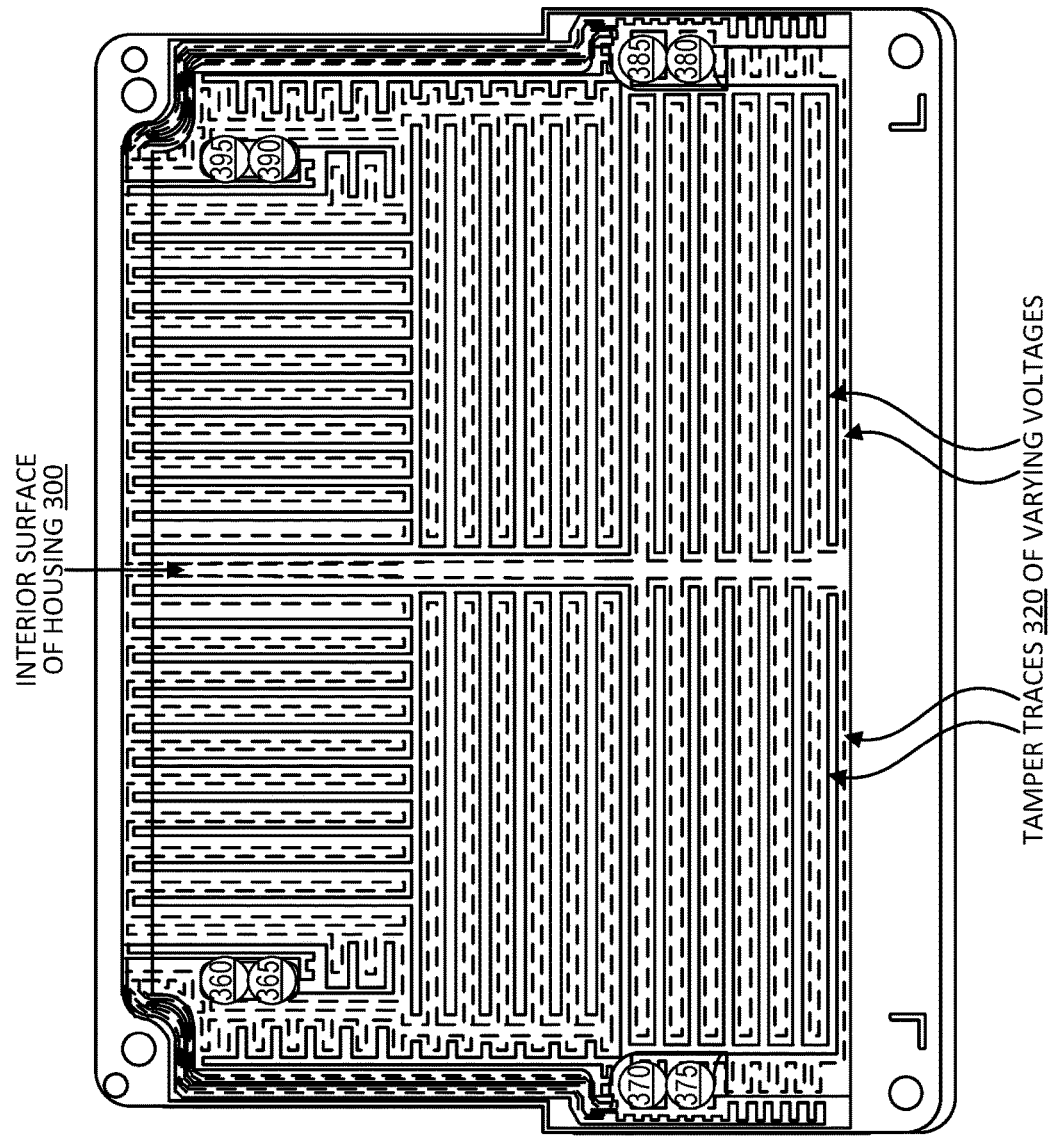

TAMPER DETECTION SYSTEM

BACKGROUND

For certain electronic devices, it is particularly important to protect against physical tampering after the device has been sold or distributed to an end-user. For example, tampering is of particular concern for devices that store or process sensitive data and for devices having functions or capabilities that incentivize unwanted, unauthorized intrusions into the devices. For example, a payment terminal may process payment transactions, and may interact with payment devices such as a payment card having a magnetic strip that is swiped in a magnetic reader of the payment terminal, a payment device having a Europay/Mastercard/Visa (EMV) chip that is dipped into corresponding EMV slot of the payment terminal, and near field communication (NFC) enabled devices such as a smartphone or EMV card that is tapped to the payment terminal and transmits payment information over a secure wireless connection. The payment terminal may receive payment information from the payment device as well information about a transaction, and may communicate this information to a payment system for processing of the transaction.

As of a result of its central role in the transaction processing system, the payment terminal is a prime target for third party attackers attempting to access payment information, process fraudulent transactions, and otherwise engage in fraudulent activities or theft. In many cases, the attackers attempt to physically access components of the payment terminal, such as one or more communication lines carrying data or a processor that communicates and processes payment information. Attackers may attempt to eavesdrop on signals (e.g., a passive attack) or to modify or spoof payment processing communications (e.g., an active attack) by injecting malicious signals into the payment terminal.

In an effort to thwart physical attacks, payment terminals may implement tamper detection devices such as tamper meshes and tamper switches. For example, if an attacker attempts to remove the cover of the payment terminal, a tamper switch may open. A traditional tamper detection technique in an electronic device is to enshroud the sensitive components (e.g., processor or other circuitry of payment terminal) within the device with a tamper mesh. The tamper mesh is connected to an electrical power source and to a detector within the device. If an attacker attempts to access the sensitive components (e.g., by drilling a small hole into the payment terminal), the conductive trace may be broken, resulting in an open circuit. The detector may sense an open circuit of the tamper switch or tamper mesh, which may shut off the payment terminal or trigger another appropriate countermeasure in response.

While such techniques provide tampering protection from actual tampering attacks, it is also possible that certain acts, such as unintentional handling of the device, or even the environment in which the device operates may trigger an unwanted tamper response.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

FIG. 3A is an interior surface of the housing for the card reader with an exemplary arrangement of tamper traces of varying voltages in accordance with some embodiments of the present disclosure;

DETAILED DESCRIPTION

Figure 1A:
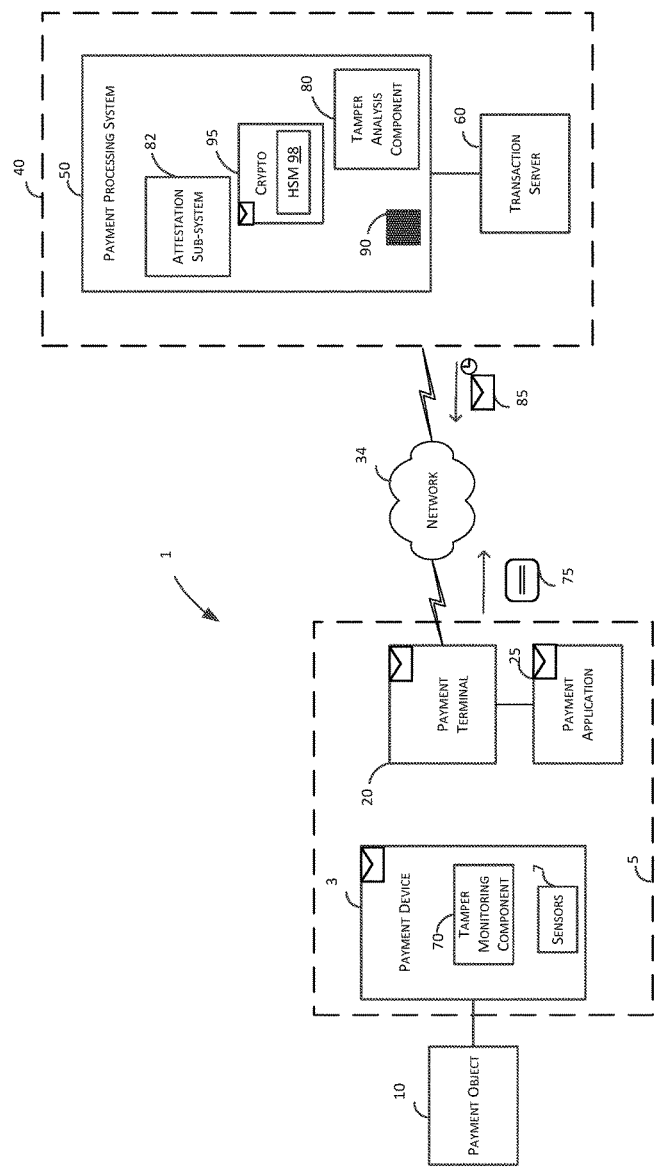
FIG. 1A is a system that processes a payment card based transaction by use of a card reader with built-in tamper protection, in accordance with some embodiments of the present disclosure.

Introduced here is a system and technique for tamper detection and analysis of tamper behavior in an electronic device by creating a device profile specific and unique to the electronic device, where the tamper profile indicates at least a threshold for or conditions that amount to tampering. The system and method, as described herein, also discloses ways to customize and update the device profile of the electronic device based on an analysis of the behavior of that specific device, or the environment in which it is operating, over time. Additionally, or alternatively, the device profile can be customized based on a history or pattern of tamper events and/or false tamper positives associated with that electronic device, devices operating in an environment similar to the device, transients e.g., electrical, or mechanical transients, or even other devices matching device's profile or specifications. Examples of electronic devices include, but are not limited to, communication devices, payment readers, payment terminals, security devices used in transportation, packaging, financial systems, or accounting and the like.

The device profile includes definition of events that are to be deemed as tamper events, potential tamper events, or non-tamper/tamper-like/false positives. The device profile may include threshold tolerances, such as threshold voltages or threshold currents, which when compared with values corresponding to an event can help distinguish the event as a tamper or a false tamper event. The device profile can also include description of environment in terms of location, temperature, pressure, or other such characteristics that are unique to the device or where it operates. Additionally, the device profile can also include the details of the sensors or conductive traces, as in the case of tamper meshes, which were used for tamper detection versus behavioral analysis. Also, in some cases, the device profile can include a status of the trace to indicate whether or not it should be kept enabled for the duration of the payment transaction. For example, certain traces that are susceptible to transients due to environmental changes can be disabled as per device profile so as to not cause a tamper condition.

In one example, the tamper condition or tamper event is defined as any attempt (physical or logical) to remove or interfere with the operation of the device, for example an attempt to bypass the secure elements to get to the memory of a device. A tamper event is detected if an improper voltage is detected on the IC terminal through which the pulse is conducted, or a voltage different from the threshold tolerance. If the event is associated with a voltage substantially close to threshold tolerance, the event may be tagged as potential tamper event.

The event may be tagged as a false tamper positive based on a number of factors. For example, in cases if the voltage is within the threshold tolerance or substantially close, but historically, readers in an environment as the specific reader exhibit similar voltages. Furthermore, the readers in the vicinity may have reported such voltages due to environment, such as pressure or temperature variations; therefore, the event may be tagged as a false tamper positive rather than a true tamper event. In another example, the voltage anomaly may be attributed to and accompanied by temperature or pressure variations around the reader, such as a sudden dropping of the reader. Furthermore, the voltage anomalies may be specific to the merchant, merchant business, and the location where the reader is operating. For example, if the merchant has a mobile business and moves around a lot, there is a higher likelihood of the reader being exposed to environmental variations, including extremes.

In some implementations, after a reader is registered and a device profile is associated with it, the device profile may be reviewed periodically or after an override request is received. The device profile is reviewed to ensure that the current behavior is consistent with the behavior on which the device profile was originally created. For example, if the reader is now located in an environment where temperature or pressure variations no longer apply, the device profile reflects that through an updated device profile that allows for a more relaxed threshold to detect tamper events.

In some implementations, the tamper detection system generates an attestation ticket with conditions of validity to indicate the time and conditions used to generate the device profile and present it to indicate whether or not the device is secure or a payment transaction is secure. The attestation ticket can also indicate to any other entity that the participating entities, such as payment terminal, the payment object reader, or the payment application (together referred to as payment platform) are secure and trusted and thus, any requests originating from the platform are also secure. Furthermore, the attestation ticket includes the conditions (such as allowability criteria, threshold values, pressure values, etc.) that are barred from generating a tamper response. For example, if the voltage fluctuation is within a threshold value, say due to temperature variations, the tamper response is not generated. Also, if the payment platform is configured to receive software PINs, the platform can do so as long as it is attested. If the payment platform is not attested, for example, if the payment terminal is not attested, the reader does not communicate with the payment terminal or the payment application until the payment processing system has validated the payment device. Software PIN is just one of the many reasons why validation is performed, as will be understood by a person skilled in the art. As described herein, each payment device can have a device profile that is unique to the environment or conditions specific to the reader or platform, and an attestation ticket is generated each time a new transaction occurs, registration is initiated or a reader pairs with a new terminal, for example.

Generally, an electronic payment terminal such as a payment reader may interface with various types of payment devices. For example, smart phones and smart watches have NFC payment applications that allow a customer to "tap" in close proximity to the payment terminal in order to pay. Payment information is transmitted and received wirelessly over a radio frequency (RF) connection between the payment device and the payment reader. EMV cards include an EMV chip that is "dipped" into a slot in the payment reader. The EMV card typically remains in the reader, and communicates with the payment reader through a physical electrical connection. Once the transaction is complete, the EMV card may be removed. Also, many payment cards retain traditional "swipe" technology in which information about a payment card is transferred to the payment reader by swiping a magnetic card stripe through a magnetic reader of the payment reader.

In all of these scenarios, there are multiple opportunities for an attacker to attempt to obtain the payment information in order to steal payment data or otherwise engage in fraudulent transactions. For example, an attacker may attempt to intercept NFC communications, read data being communicated over the physical connections with the EMV card, or intercept that data from the magnetic stripe of a traditional swiping transaction. Moreover, signals carrying this and other critical information are transmitted within the payment reader and processed by processors and other circuitry of the payment reader.

Accordingly, numerous types of tamper detection devices such as tamper switches and tamper meshes are integrated into a payment reader. These tamper detection devices can sense attempts to gain improper physical access to the payment reader (e.g., by opening the payment reader or drilling into the payment reader to access signals or components), attempts to physically provide electrical signals to the payment reader (e.g., attempts to inject malicious signals into externally accessible pins of the payment reader, such as EMV pins), and attempts to wirelessly introduce malicious signals to the payment reader. Some tamper detection devices may open a circuit in response to tamper attempt. The tamper switches and meshes are generally active elements and as such are powered by a power source, also included in the tamper detection devices. Additionally, the memory that stores the security keys and other confidential information is also powered by the power source. The tamper detection device thus actively monitors tamper events and executes tamper responses by deliberately clearing memory on detecting tamper events via the power source.

In some instances, the tamper detection devices may get triggered, albeit accidentally, due to unintentional dropping of the payment reader or due to variations in environment.

For example, if the payment reader is in a high-temperature or high humidity environment, the tamper switches or the tamper meshes may accidentally detect the event as an open circuit and subsequently cause security keys to be erased, akin to a real tamper attempt. False tampering positives like these cause sensitive and critical data to be deleted for no reason, which is likely to frustrate the user of the device. Certain false tamper events can be subtle so as to not cause a voltage discontinuity, which can remain undetected by a traditional tamper detection device, right away but manifest into a full-fledged tamper-like event at a later time.

Traditional approaches focus on cookie-cutter tamper detection methods even for the problems identified above even though each payment reader is likely to be exposed to a unique set of environmental parameters and as such behavior of the payment reader is also unique. Furthermore, traditional mechanisms have no way to detect a tamper behavior, which can be indicative of either a tamper event or a tamper-like event at a future time.

To at least address the problems identified above, the payment reader includes tamper detection circuitry having a set of capacitors configured to deliberately slow down the signals, such as those generated by tamper events. This is particularly helpful in dealing with tamper-like events due to accidental dropping of payment readers or temperature variations, for example. The momentary signals generated in response to the tamper-like events can be slowed down by the capacitor arrangement so that a full-fledged tamper response can be avoided.

In another embodiment, the payment reader includes a tamper detection device that monitors the conductive trace(s) to obtain tamper data (such as a voltage or current discontinuity), which is indicative of tamper events, and behavioral data, which is indicative of weather or other environmental sensitivity. The tamper detection device obtains tamper and behavioral data from the same or neighboring conductive traces at different times to ensure there is no interference between the measurements of two. In other implementations, the tamper data and the behavioral data is obtained off of different trace lines. While in traditional systems, all or certain traces were being used only for tamper detection, in the embodiments disclosed herein, the tamper detection device can select which traces to use for tamper detection and which traces to use for determining behavior of the device over time. The selection logic can be random or based on data reported by faulty payment card readers or other readers in the field. The selection logic can also be based on which traces are more likely to be susceptible to tampering, for example, traces closer to the seam of the reader may be selected to detect tamper events.

In some embodiments, each tamper detection device is associated with two tamper pins for tamper detection and two tamper pins for behavioral data collection and analysis. The tamper detection device transmits a signal such as a random sequence of pulses from one of the tamper pins, which if received by the associated tamper pin via the associated tamper detection device, indicates that the tamper detection device has not detected a tamper attempt. Conversely, if any of the pulses are not received, it is likely that there has been a tamper attempt. Thus, in terms of tamper data and behavioral data, the tamper data amounts to the data obtained when a tamper event is detected.

For behavioral data collection, the tamper detection device transmits a signal such as a random sequence of pulses from one of the tamper pins and detects the signal variation, if any, at the associated tamper pin. The behavioral data received at the associated tamper pin indicates whether the tamper detection device or that specific trace is likely to generate a tamper-like event due to environmental variations, for example. Alternatively, the tamper detection device includes a probe to track signal variations on a selected conductive trace or any other portion of the tamper detection device. The signal variations may be analog in nature. The tamper detection device compares the signal variations to a threshold value to determine whether or not to disable the trace from accidentally triggering a tamper response.

Collection of tamper data and behavioral data may also be implemented by tamper pins that are not currently transmitting or receiving pulses. Each of these tamper pins may be switched to an input state, and if a signal is received at any of these tamper pins, it is likely that there has been a tamper attempt if the signal matches a device profile or a tamper-like event, not warranting a tamper response, if the signal does not match a device profile. When it is time for any tamper pin to send a pulse to its associated tamper detection device, it can switch back to the output state.

In some embodiments, a number of tamper detection devices may be multiplexed to a single tamper pin, which may be referred to as a tamper detection pin. Thus, while a tamper pin that outputs a signal or pulses (e.g., a tamper signal pin) may be associated with each tamper detection device, the outputs of multiple tamper detection devices (i.e., the outputs received from each tamper signal pin) are received at a single tamper detection pin. Tamper detection logic of the tamper detection circuitry demultiplexes and processes the received data. Each of the tamper signal pins may also be switched to an input state while not transmitting, thus providing additional possibilities for sensing tamper attempts.

In at least some embodiments, the introduced technique includes electrically coupling a conductive (e.g., metal) trace, in series via a resistor, to an internal power supply (e.g., battery) that supplies power to a security component within a processor of the electronic device. The security component performs various security operations involving sensitive data received by the electronic device. The introduced technique further includes electrically coupling the internal power supply to a sensor, such as a power detector, for use in tamper detection on the conductive trace, such that a physical tampering-induced short-circuit condition on the conductive trace would result in a (significant) drop in voltage below a predetermined threshold (e.g., 0.01 V) at a node measured by the power detector, where substantially all voltage of the battery is dropped (e.g., 99.9%). The power detector detects and perceives the drop-in voltage as a "collapse" of the power supply. As used here, the term "collapse" refers to an operation failure of an electronic component (e.g., a battery fail). Such collapse of the power supply is indicative of a tampering event to the detector, which in response, can output a signal to cause one or more operations of the security component to be disabled.

As disclosed herein, the sensor or a combination of several sensors also determines tamper-like conditions on the conductive trace caused by environmental variations. Traditionally, such tamper-like conditions caused by environmental variations are likely to cause the power supply to collapse, however, as certain embodiments disclose herein, the tamper-like conditions need not necessarily trigger a tamper response and can instead be used to selectively disable the "problem" trace for a predefined duration of time or monitor the trace over a period of time to determine whether the tamper-like condition is indicative of a more sophisticated form of tamper attack or indicative of a behavior unique to the reader or place where the reader is located. In some implementations, once it is confirmed that the tamper-like condition is in non-fatal, the behavioral data, obtained off the problem trace, for example as a result of scheduled or programmed monitoring, can be analyzed for various purposes, such as, but not limited to: determination of a behavioral profile of the reader. If majority of readers in a particular location report similar behavioral profiles, the server may set a device profile unique to that profile to avoid triggering of a tamper response in certain conditions for all readers matching the problem reader. A common problem in a trace across various readers may be indicative of a systemic problem with all readers matching a certain description. The threshold voltage that triggers the tamper response may be varied to account for voltage variations due to temperature or other weather related anomalies. The behavioral profile can also be unique to that specific merchant, for example, if the merchant is more prone to dropping the reader, the device profile can be configured to take into account pressure related tamper events so as to avoid triggering of response in such cases.

Therefore, the tamper detection device can learn and configure the device profile or adjust an existing device profile that is best suited for the environment that is unique to the merchant or location. The device profile can also be unique based on other factors such as time of the day, product that is being purchased, ticket price, and the like.

For example, if readers in high humidity or temperatures like Florida or Arizona are susceptible to false positives, a device profile unique to that location may prevent false triggering of tamper response by disabling certain traces that are susceptible to tamper due to environmental variations. Alternatively, a device profile unique to the merchant may prevent triggering of tamper response due to accidental dropping of readers, if the merchant is constantly on the move and has a history of dropping readers, sensed via pressure variations by the sensor of the tamper detection device.

The introduced technique is advantageous in that it selectively utilizes certain traces for tampering while other traces for determining behavior of the reader over time. The technique utilizes the availability or lack of an existing signal (i.e., internal power supply signal) of the security component to detect physical tampering with the electronic device. Furthermore, the technique also discloses monitoring of at least a portion of the tamper detection device to determine behavior of the device over time. The electronic device or a remote server analyzes the monitored data to yield a tamper behavior profile for the payment reader based on which it may be determined whether the security component is subject to a false tamper positive due to an environmental variation. Hence, any operation being performed by the security component can be disabled substantially immediately upon detecting tampering with the technique introduced here, as a response to a tamper event. Alternatively, the security component, such as a conductive trace, may be isolated or no longer subjected to tamper detection or monitoring if it is determined that the conductive trace is prone to generating false tamper events. The introduced technique can be combined with other traditional tamper detection techniques to increase the complexity and robustness of the detection mechanism, thereby enhancing the overall security of the electronic device. A processing system, for example a remote server, can analyze the behavior of a certain trace or traces in a payment reader to generate a behavioral profile specific to the reader. Furthermore, the processing system can pre-apply the behavioral profile to another reader having a configuration similar to the reader. For example, all readers in a certain geographical location are likely to be exposed to a similar environmental condition thus prompting conditions that are likely to generate similar false tamper events. By preemptively disabling the same conductive traces in readers matching a certain profile, false tamper events can be avoided. Furthermore, the readers not matching the profile or known to be resistant to false tamper events can be attested with tamper certificates. The tamper certificate can be sent every time a tamper event is detected. The tamper certificate helps rule out the possibility of false tamper events.

Thus, the embodiments disclosed herein provide a tamper detection method and system that is more reliable than conventional techniques. The tamper detection methods and systems help avoid generation of tamper responses to false tamper positives. Since the device profile is unique to a reader, the tamper responses can be managed in a more granular, targeted and efficient way.

Some recurring terms are now described. In some embodiments, the conductive trace can include a wire mesh, which can be disposed along a circuit board layer within the electronic device. The term "mesh" as used here refers to one or more conductive traces that may be, but are not necessarily, electrically coupled to each other. In some embodiments, the conductive trace can be interwoven with one or more other conductive traces that are connected to another detector (different from the power detector) using a traditional tamper detection technique (i.e., "traditional conductive traces" or "traditional mesh"). In particular, the different interwoven conductive traces can run very closely together, along spatially parallel paths, across one or more circuit board layers, to render it more difficult for an attacker to circumvent the traces of the electronic device. In such "dual-trace" embodiments, the traditional trace(s) can be used to detect an open-circuit condition while the other trace (connected to the internal power supply) is used to detect a short-circuit condition, for example. Alternatively, the traditional trace can be used to detect a tamper event, through an open-circuit condition, while the other trace can be used to determine a behavioral profile of the payment reader.

In some embodiments, the conductive trace can include a metal dome switch, which can be affixed to an electronic surface of a component of the electronic device (e.g., circuit board) during the manufacturing process. In such embodiments, the conductive trace (connected to the internal power supply) can be used to detect a short-circuit condition on the metal dome switch, such as may result from physical tampering. In some embodiments, the conductive trace can be combined with another conductive trace to facilitate detection of physical tampering with an input interface of the electronic device. In such embodiments, one trace can be disposed within a flexible circuit region of the input interface while the other trace is disposed spatially in parallel with the electrical connector between the input interface and the electronic device. Tampering is determined to be detected upon detection of a short-circuit condition on either trace.

In certain embodiments, the electronic device in which the introduced technique is implemented is a card reader designed to be coupled to a handheld mobile device (e.g., a smartphone or tablet computer) and configured to read data from a wallet-size card (e.g., a credit card, debit card, driver's license or identification card) based on a card swipe. The term "swipe" as used here refers to an action of reading data from a card, including reading a magnetic stripe, reading a smartcard integrated circuit (IC) chip, reading an optical pattern, etc. These features and aspects are discussed further below in connection with the accompanying figures. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other features not described in detail herein. Additionally, some well-known structures or functions may not be shown or described in detail below, so as to avoid unnecessarily obscuring the relevant description. Some of the recurring terms are now defined.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "component" or "engine" refers broadly to general or specific-purpose hardware, software, or firmware (or any combination thereof) components. Components and engines are typically functional components that can generate useful data or other output using specified input(s). A component or engine may or may not be self-contained. Depending upon implementation-specific or other considerations, the components or engines may be centralized or functionally distributed. An application program (also called an "application") may include one or more components and/or engines, or a component and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

The term "communication network" may be any type of network known in the art, such as a local area network or a wide area network, such as the Internet, and may include a wireless network, such as a cellular network, a cloud network, a local wireless network, such as Wi-Fi and/or close-range wireless communications, such as Bluetooth and Bluetooth low energy, near field communications (NFC), a wired network, or any other such network, or any combination thereof. Accordingly, the network may include both wired and/or wireless communication technologies, including Bluetooth, Bluetooth low energy, Wi-Fi, and cellular communication technologies like worldwide interoperability for microwave access (Wi-MAX), 3G, 4G, CDMA, digital subscriber line (DSL), etc., cloud computing technologies, as well as wired or fiber optic technologies. Additionally, or alternatively, the communication network may be a mesh network. For example, in a wireless local area network (WLAN), network devices may be configured to receive and forward communications, which are ultimately destined for a different device. These types of networks are generically referred to as "mesh" networks, where network nodes may form a "mesh" of paths for which communications may travel to reach their destination. Wireless networks may use beacon transmissions to advertise the network's existence, as well as provide information about the network and capabilities associated with the network. Different kinds of beaconing mechanisms may be used, for example, one for infrastructure mode networks (also called basic service set (BSS) networks) and one for ad-hoc mode networks (also called independent basic service set (IBSS) networks). In infrastructure networks, access points (APs) are the entities responsible for generating beacons whereas in ad hoc networks, all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP. Components used for such communications can depend at least in part upon the type of network, the environment selected, or both. Protocols for communicating over such networks are well known and are not discussed herein in detail.

As used here, the term "pairing" or "associating" refers to a process in which the POS terminal and the payment object reader establish a communication channel with each other using wireless communication protocols, for example, Bluetooth®, Bluetooth Low Energy®, Wi-Fi®, etc. The POS terminal and the payment object reader each includes a transceiver capable of transmitting data between them once "paired."

As used herein, RSSI, or "Received Signal Strength Indicator", is a measurement of how well the payment device can hear a signal from an access point or router, such as Wi-Fi card of the payment object reader. RSSI is a term used to measure the relative quality of a received signal to the POS terminal, but has no absolute value.

Additionally, as used herein, the term "payment card," "payment object," or "payment instrument" refers to a payment mechanism that includes a debit card, a credit card, a prepaid gift card, or the like, a smartcard that has an embedded integrated circuit chip (e.g., Europay-Master-Card-Visa (EMV) card), a proxy card, or any card that functions as a combination of any of these mechanisms. The term "proxy object" as used herein refers to a card that may or may not bear a card number/account number that appears to be that of a real credit or debit card account (i.e., it is in the correct format), but where that card/account number is actually only a proxy for the customer's real card/account number. Another type of payment object is a biometrically identifiable instrument, which may be initialized using a person's finger (e.g., for fingerprint recognition), face, iris or retina, heartbeat, etc.

Alternatively, the payment object can be a software instrument or virtual instrument, such as a virtual wallet configured to initiate contactless payment transactions, e.g., a key fob, a mobile device having an RFID tag, etc. Other examples of payment object may also include a prepaid card, a gift card, a rewards card, a loyalty points card, a frequent flyer miles card, checks, cash, or in general, any kind of financial instrument that holds financial value or provides a promise to pay at a later time. Thus, a payment object transaction (also referred to as payment card transaction) may be any be a transaction where a merchant or a user swipes the user's credit card through a payment object reader in exchange for a product or service offered by the merchant.

The term "swipe" here refers to any manner of triggering a payment object reader to read data from a payment object, such as by dipping into, tapping, hovering, bringing in close contact or passing the payment object into or through a payment object reader.

The term "broadcasting" refers to the modes of operation of the Bluetooth enabled device to enable connection with neighboring devices and can be either discoverable mode or advertising mode. Discoverable mode is a state within Bluetooth technology integrated devices that enables Bluetooth devices to search, connect and transfer data with each other. Discoverable mode is used to propagate the availability of a Bluetooth device and to establish a connection with another device. In some cases, the device can also be in the "non-discoverable" mode, which prevents devices from being listed during a Bluetooth device search process. However, a non-discoverable Bluetooth device is visible to devices that know its address or can discover its address.

The term "advertising" is meant to refer to another mode of operation of the Bluetooth enabled device. Both broadcasting and advertising help initiate, establish, and manage the connection with other devices. If the device just needs to communicate the status of a few parameters or alarms and does not absolutely require acknowledgement from other side, the BLE advertising mode may do the job with just a few commands sent to the BLE controller. When advertising mode is enabled, the BLE device will start to transmit special packets carrying advertising information as Payload Data Units (PDU) on the RF channels dedicated for this purpose. BLE is utilizing a common structure of over the air packets for advertising and data channels. An advertising channel PDU has a header and actual payload. The header contains information about the size of the payload and its type: advertising channels are used for exchanging information before making a connection between devices. Hence, different payload types are supported to broadcast information about the device's ability (on inability) to support a connection, to request more information or to respond with additional device information and to request the initiation of a data connection with another device.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B).

As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to non-transitory tangible, physical objects that store information in a form that is readable by a computer. These terms exclude any transitory wireless signals, wired download signals, and any other ephemeral signals. The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

While certain devices, e.g., the payment object readers and POS terminals are shown as including distinct components, this is merely for ease of illustration and not intended as limiting. In various implementations, the payment object readers and POS terminals may be identical, similar, or distinct. Moreover, the components shown and described for the payment object readers and POS terminals may be implemented as more components or as fewer components and functions described for the components may be redistributed depending on the details of the implementation. Additionally, in some implementation, there may be several, hundreds, thousands, hundreds of thousands, or more, of the payment object readers and the POS terminals. Further, in some implementations, configuration, structure, and operational characteristics of the payment object readers and/or POS terminals may vary from device to device. In general, payment object readers and the POS terminals can each be any appropriate device operable to send and receive data, requests, messages, electronic messages, text messages, alerts, notifications, pop-up messages, push notifications, or other types of information over the one or more networks or directly to each other.

The registration or verification technology introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions. Various embodiments will now be described in further detail with the help of one or more figures.

FIG. 1A conceptually illustrates a network environment 1 in which the tamper monitoring and detection technique can be implemented. Note that FIG. 1A omits certain components of the network environment 1 for ease of understanding. As such, the network environment 1 may have additional components, such as one or more external connectors and/or input/output (I/O) devices (not shown), to enable the network environment 1 to incorporate another external device and/or to users, or other components that enable the components to perform various functionalities. As noted above and further described below, the payment terminal can be a card reader, a point-of-sale terminal, or a combination of a card reader and a point-of-sale terminal.

Turning now to the Figures, FIG. 1A depicts an illustrative block diagram of a network environment 1 in accordance with some embodiments of the present subject matter. In one embodiment, network environment 1 includes a payment object 10, payment device or payment object reader 3, payment terminal 20, payment application 25, network 30, and payment server 40. In one implementation, the payment object reader 3, payment terminal 20 and payment application 25 are entities of a payment platform 5.

In one implementation, the payment device 3 includes a tamper monitoring component 70, which may further include a fine conductive mesh that is disposed over the device components, such as processor and memory on the printed circuit board. In one embodiment, the mesh includes pairs of fine conductive wires or traces where the traces in pair extend in a serpentine fashion in parallel with one another across the top of the components. The traces are connected to the tamper monitoring component 70 through tamper end points (not shown) if any of the traces are broken or disrupted in any way, the tamper monitoring component 70 detects the anomaly, for example as a voltage or current fluctuation. Also, if any part of a first trace touches a second wire, then that condition is also detected by the tamper monitoring component 70 as a tamper event. Accordingly, if a fraudster were to attempt to probe terminals on the processor by pushing a probe through the mesh, then the probing would likely cause a first trace to touch a second trace and this tamper condition would be detected. If the fraudster were to attempt to drill a hole in the mesh to obtain access for a probe, this tamper condition would also be detected. The tamper monitoring component 70 is also configured to selectively or entirely remove the contents of the memory in response to a detected tamper condition. Alternatively, or additionally, the tamper monitoring component 70 can obtain data corresponding to the tamper condition and send to the payment processing system 50 for further analysis and tamper response.

In some cases, the tamper monitoring component 70 can also be triggered, unintentionally or incorrectly, for example due to accidental dropping of the device 3 or due to other environmental anomaly.

In an exemplary embodiment, the tamper monitoring component 70 monitors, through one or more sensors 7, the conductive trace(s) to obtain tamper data (such as a voltage or current discontinuity as described above), which is indicative of tamper events. In addition, the tamper monitoring component 70 also monitors behavioral data, which is indicative of pressure, temperature, or other environmental sensitivity, transients, or any changes in the behavior of the device over a period of time. The tamper monitoring component 70 obtains tamper and behavioral data from the same or neighboring conductive traces at different times to ensure there is no interference between the measurements of two. In other implementations, the tamper data and the behavioral data is obtained off of different traces or wires, or different tamper end points. For example, in some embodiments, each tamper monitoring component 70 is associated with two tamper end points for tamper detection and two tamper end points for behavioral data collection and analysis. In yet other embodiments, the behavioral data can be obtained from sensors 7 associated with the payment device 3. For example, sensors 7, such as accelerometer, temperature sensors, location sensors, can track data corresponding to the reader 3.

The tamper monitoring component 70, via a selection logic, determines which traces to target for detecting tamper events and analyzing behavior of the reader. For example, the tamper monitoring component 70 can communicate with telemetered data collected from all readers, faulty readers, or readers matching a specific profile, based on location, merchant category code, transaction volume, etc.

In one implementation, the tamper monitoring component 70 transmits a signal such as a random sequence of pulses from one of the tamper pins, which if received by the associated tamper pin via the associated tamper monitoring component 70, indicates that the tamper monitoring component 70 has not detected a tamper condition. Conversely, if any of the pulses are not received, it is likely that there has been a tamper attempt. The tamper data amounts to the data obtained when a tamper condition is detected.

For behavioral data collection, the tamper monitoring component 70 transmits a signal such as a random or fixed sequence of pulses from one of the tamper pins and detects the signal variation, if any, at the associated tamper pin. The behavioral data received at the associated tamper pin indicates whether the tamper monitoring component 70 or that specific trace is likely to generate a pseudo tamper event due to environmental variations, for example. The pseudo tamper event gives the perception of a tamper condition but is ideally not sufficient to trigger a tamper response, such as deletion of memory. Thus, the behavioral data helps differentiate between a tamper-like condition or tamper condition so that the tamper like event can be ignored or otherwise treated differently from a true tamper condition. Alternatively, the tamper monitoring component 70 includes a probe to track signal variations on a selected conductive trace or any other portion of the tamper monitoring component 70. The signal variations may be analog in nature. In one example, the tamper monitoring component 70 compares the signal variations to a threshold value to determine whether or not to disable the trace from accidentally triggering a tamper response. In another example, the tamper monitoring component 70 notifies the merchant or the payment processing system 50 that a tamper-like event may occur.

The collection of tamper data and behavioral data 75 may also be implemented by tamper pins that are not currently transmitting or receiving pulses. Each of these tamper pins may be switched to an input state, and if a signal is received at any of these tamper pins, it is likely that there has been a tamper attempt if the signal matches a device profile or a tamper-like event, not warranting a tamper response, if the signal does not match a device profile. When it is time for any tamper pin to send a pulse to its associated tamper monitoring component, it can switch back to the output state.

In some embodiments, a number of tamper monitoring components may be multiplexed to a single tamper pin, which may be referred to as a tamper monitoring pin. Thus, while a tamper pin that outputs a signal or pulses (e.g., a tamper signal pin) may be associated with each tamper monitoring component 70, the outputs of multiple tamper monitoring components (i.e., the outputs received from each tamper signal pin) are received at a single tamper detection pin. Tamper detection logic of the demultiplexes and processes the received data. Each of the tamper signal pins may also be switched to an input state while not transmitting, thus providing additional possibilities for sensing tamper attempts.

As disclosed herein, the tamper monitoring component 70 also determines tamper-like conditions on the conductive trace caused by environmental variations. Traditionally, such tamper-like conditions caused by environmental variations are likely to cause the security component connected thereto to collapse and memory of the reader to be deleted, however, as certain embodiments disclose herein, the tamper-like conditions need not necessarily trigger a tamper response and can instead be used to selectively disable the "problem" trace for a predefined duration of time or monitor the trace over a period of time to determine whether the tamper-like condition is indicative of a more sophisticated form of tamper attack or indicative of a behavior unique to the reader or place where the reader is located. In some implementations, once it is confirmed that the tamper-like condition is non-fatal, the behavioral data, obtained off the problem trace, for example as a result of scheduled or programmed monitoring, can be analyzed for various purposes, such as, but not limited to: determination of a behavioral profile of the reader. If majority of readers in a particular location report similar behavioral profiles, the server 40 may set a device profile unique to that profile to avoid triggering of a tamper response in certain conditions. For example, the threshold voltage that triggers the tamper response may be varied to account for voltage variations due to temperature or other weather related anomalies. The behavioral profile can also be unique to that specific merchant, for example, if the merchant is more prone to dropping the reader, the device profile can be configured to take into account pressure related tamper events so as to avoid triggering of response in such cases.

Therefore, the tamper monitoring component 70 can learn and configure the device profile or adjust an existing device profile that is best suited for the environment that is unique to the merchant or location. The device profile can also be unique based on other factors such as time of the day, product that is being purchased, ticket price, and the like.

In one implementation, the payment device stores the device profile in the device 3, while in other implementations, the payment terminal 20 or the payment server 40 stores the device profile to attest later interactions.

In an exemplary embodiment, the payment server 40 may include a plurality of servers operated by different entities, such as a payment processing system 50 (also referred to as PPS 50) and a transaction server 60, such as an acquirer, issuer, card processing network or all. PPS 50 can include additional components, such as the tamper analysis component 80 (for example similar to tamper monitoring component 70), a behavioral analysis component 55, and crypto 95. The tamper analysis component 80 obtains data from the tamper monitoring component 70 and on analysis, generates a tamper response if the data indicates a tamper event. In case the data indicates that the tamper event is a tamper-like event potentially able to generate a false tamper positive, the tamper analysis component 80 may trigger behavioral analysis of the data to further determine whether the tamper-like event can be used to create a tamper behavior profile or a device profile for the reader through the behavioral analysis component 55. Crypto 95 can further include or is associated with hardware security module (HSM) 98. The database 90 can store device profile of all readers, attestation tickets, routines and instructions for tamper detection and analysis, telemetered data sent by readers in the field related to specific traces that were tampered with and conditions, including environmental conditions, under which the reader failed. These components of network environment 1 facilitate an electronic payment transaction between a merchant and a customer in a secure and fast manner using tamper monitoring, detection, and attestation schemes synchronous to the payment transaction.

Operationally, the electronic interactions between the merchant and the customer take place between the customer's payment object 10 and the merchant's payment terminal 20 (including the payment object reader 3). The customer has a payment object 10 such as a credit card having magnetic stripe, a credit card having an EMV chip, or an NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application. The merchant inserts the payment object 10 in the payment object reader 3 which is paired or otherwise connected to the payment terminal 20. The process of pairing is not described and will be understood to a person skilled in the art.

In some embodiments (e.g., for low-value transactions or for payment transactions that are less than a payment limit indicated by the NFC or EMV payment object 10), the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment processing system 50 and one or more banks of the merchant and customer (e.g., a transaction server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

In some embodiments, payment device 3 or the payment terminal 20 may perform physical and/or logical scans or tests to collect information that is useful in determining: whether or not a transaction is fraudulent; whether an attacker is attempting to tamper with the payment device 3; whether an event is a false tamper positive event; or whether an event is potentially capable of triggering a tamper response. The payment device 3 may take corrective action (e.g., tamper response amounting to aborting a transaction, or disabling one or more components (such as power source or deleting memory) of the payment terminal 20) based on a comparison of the collected information to one or more test criteria or commands. The corrective action in response to detection of a false tamper positive event can be an instruction to disable a particular component or a conductive trace, or instruction to regard the reading of the trace as non-tamper data or prohibit the tamper detection system from responding to the false tamper positive event.

In some embodiments, the information may be transmitted to the payment server 40 (e.g., payment processing system 50) for processing. Payment server 40 may determine whether to take a corrective action based on the received information as well as information from previous transactions and other ongoing transactions. In some embodiments, payment server 40 may also generate updated test criteria for payment terminal 20 and provide the update to the payment terminal 20 or payment reader 3 for use in processing of future transactions.

In another embodiment, the payment server 40 also obtains data from the card reader at predefined or random time intervals for behavioral or trend analysis. Data can be tracked on particular or random conductive traces, included in the tamper mesh, or electrical components, such as transmitter, receiver, sensors, and the like. The behavioral analysis can indicate signal variations on the trace, which may be due to varying environmental factors, such as weather variations, temperature variations, pressure variations, or elevations variations. The payment server 40 analyzes the data to determine whether the variations are capable of triggering a tamper response. Alternatively, the payment server 40 can generate a device profile to use for transactions or other attempts that trigger the device that a tamper response is not warranted in certain situations defined in the device profile or that the tamper response need not be generated during a certain time or at all for a specific reader.

Based on the information that is received at payment terminal 20 from payment server 40, the merchant may indicate to the customer whether the transaction has been approved. In some embodiments, such as a chip card payment device, approval may be indicated at the payment terminal, for example, at a screen of a payment terminal. In other embodiments, such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

As described above, the payment system 1 discloses methods and system to generate, based on the custom device profile, an attestation ticket 85 to indicate to any other entity that the payment terminal 20, the payment object reader 3, or the payment application 25 (together referred to as payment platform 5) is secure and trusted and thus, any requests originating from the platform 5 is also secure. As mentioned before, the attestation ticket 85 can be generated as a result of a trigger, such as a request for processing a payment transaction, a drop-in voltage on a specific trace, and so on. Furthermore, the attestation ticket 85 includes the conditions (such as allowability criteria, threshold values, pressure values, etc.) that are barred from generating a tamper response. For example, if the voltage fluctuation is within a threshold value, say due to temperature variations, the tamper response is not generated for the duration of the ticket or transaction for which the attestation ticket was created. Also, if the payment platform is configured to receive software PINs, the platform can do so as long as it is attested. If the payment platform is not attested, for example, if the payment terminal is not attested, the reader 3 does not communicate with the payment terminal 20 or the payment application 25 until the payment processing system 50 has validated the payment terminal 20. Software PIN is just one of the many reasons why validation is performed, as will be understood by a person skilled in the art. As described herein, each payment device 3 can have an attestation ticket or device profile that is unique to the environment or conditions specific to the reader or platform 5. In one implementation, the device profile is created using the same methodology and tools as the attestation ticket.

In one implementation, the tamper analysis component 80 is included within the payment processing system 50, and is configured to send attestation routines, specifying various scans and tests that it would like a client component, i.e., tamper monitoring component 70, to perform on the client device, i.e., the payment platform 5. For example, the attestation routine can include test criteria or commands instructing the tamper monitoring component 70 to: measure electrical characteristics of various components of the payment application, POS terminal, payment object reader, such as the payment interfaces that interact with the various types of payment devices and test operation of software components; monitor values such as current, voltage, impedance, and capacitance, to determine whether a component is acting in an abnormal manner; measure platform characteristics such as manufacturing or engineering tolerances, timing parameters, associated behaviors; check activation of certain communication ports; measurement of the phase error, of the frequency error, of the power and of the spectrum, power signal levels such as RSSI levels, RSSI vs. frequency measurements; measure engineering tolerances, hardware imperfections inherent to analog components of the device, radio frequency response to certain signals; measure physical, mechanical, magnetic, electro-mechanical, or operational characteristics; compare platform characteristics with the population of all other platforms or platforms within a geographical area; and so on.

In one implementation, the payment platform 5 (or one of the entities within such as the payment terminal 20) requests for an attestation ticket from the payment processing system 50, say at the time of a payment transaction. For example, the tamper monitoring component 70 first requests the tamper analysis component 80 for an attestation ticket 85 to attest the payment terminal 20 or a network device, such as a communication device or a payment application executing on the terminal and so on. This can happen periodically, randomly or after or before expiration of an attestation ticket 85. In other implementations, the attestation may be triggered by a physical event, such as the merchant connecting the reader 3 with the payment terminal 20 or the merchant installing a new payment application 25 on the payment terminal 20.

In response, the tamper analysis component 80 generates an attestation routine with exemplary test criteria or commands mentioned above. On receiving the commands, the tamper monitoring component 70 scans the payment platform 5 or a portion thereof for modification, faults, or anomalies in the payment platform 5, including the applications, hardware, and operating system. The payment processing system, executing the tamper analysis component 80, not just specifies the checks the payment platform 5 executes, but also collects the resulting data from the tamper monitoring component 70, and then analyzes the data from the payment monitoring component 70 (hereinafter referred to as "attestation data 75" or "tamper/behavioral data") to identify suspicious activity. The tamper analysis component 80 and the tamper monitoring component 70 can communicate via an obfuscated and encrypted protocol, hereinafter referred to as "trusted channel," for example, implemented on top of HTTP Secure (HTTPS).

In one implementation, the tamper analysis component 80, on analysis of the attestation data 75, determines that the payment platform has a tendency to operate between certain temperatures or susceptible to certain pressure ranges and is therefore likely to exhibit faulty tamper conditions. Accordingly, the tamper analysis component 80 generates an attestation ticket 85 or "tamper certificate" to this effect and sends to the payment terminal 70 (or even the reader 3) for future transactions. Accordingly, the tamper analysis component 80 can validate a secure session between the reader 3 and the payment terminal 20 or application 25 as long as the attestation ticket is valid and as long as the condition stated in the attestation ticket is met. When the reader 3 is connected to the payment terminal 20, the reader 3 can communicate with the payment terminal 20 by presenting the ticket to the reader 3, and also to the payment processing system 50 when a transaction is being processed. In contrast, if the tamper analysis component 80 has detected tampering or otherwise security issues on the payment platform 5, such as the payment terminal 20 of the merchant, the tamper analysis component 50 does not generate an attestation ticket 85 or generates an attestation ticket 85 with an error code indicating that the tamper analysis component 50 failed to validate the secure session. The reason the payment processing system 50 generates a ticket in both cases is so that a fraudulent user cannot differentiate one device from another based on lack of ticket, and reverse-engineer to fake attestation.

The tamper analysis component 80 can assign a lifetime to the attestation ticket 85 and can send it to the device in the platform 5 that requested validation so that the platform is not scanned or tested every time a transaction occurs. When the ticket expires, the tamper monitoring component 70 re-submits request for an attestation ticket. In one implementation, the attestation ticket can also be invalidated and/or re-generated in response to other attestation triggers even though the attestation ticket is otherwise valid as per lifetime.

Examples of attestation trigger includes, but are not limited to, pairing a new reader, different from reader 3, to the payment terminal, installing a payment application to an unknown device, detecting re-location of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch®) that enter a geo-fence.

When a transaction occurs between the payment terminal 20 and the payment object reader 3, the payment object reader 3 requests the payment terminal 20 to share the attestation ticket 85. The reader 3 decrypts or sends the attestation ticket 85 as-is to the server 50, which determines from the content and/or timing whether the attestation ticket 85 is valid during the secure session. If it is valid, the server sends the approval both or to the reader and the terminal. If not, the rejection is sent to the parties.

In one implementation, the server 50 can be designed to handle a certain type of request or certain level of risk, in that case, the high-risk attestation tickets may be sent to the server 50 for a secondary authentication, while low risk tickets may be processed automatically that is without any secondary authentication. As an example, a high risk attestation ticket may be defined as a tamper-like event that is substantially close to a tamper condition. In another example, the server 50 can be designed to operate on regulations pertaining to a jurisdiction, rules, or database. As such the risk associated with the ticket may vary. In yet another example the servers could correspond to payment servers at different locations or at the same location, available for load balancing or fail over management for example. The attestation tickets and/or session certifications are stateless and can travel from one server to another and can also be synchronized across different locations. These components of network environment 1 facilitate electronic payment transactions between a merchant and a customer in a secure and fast manner using attestation schemes synchronous to the payment transaction.

The server 50, as mentioned before, can also handle encryption and decryption, say using Crypto 95 that operates using keys stored in hardware software machine. The crypto can include units such as, but not limited to, microcontrollers, processors, interfaces, and/or devices, which may be attached, and/or communicate with the devices, such as the attestation sub-system 82. Cryptographic units support the authentication of communications from interacting agents, as well as allowing for anonymous transactions. Cryptographic units may also be configured as part of the CPU. The crypto 95 is shown to include HSM keys, which can be factory set and have keys corresponding to readers and servers.

The crypto 95 facilitates the secure accessing of resources on the PPS and facilitates the access of secured resources on remote systems; i.e., it may act as a client and/or server of secured resources. Cryptographic processor interfaces can allow for expedition of encryption and/or decryption requests by the cryptographic component. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital profiles, dual profiles, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one-way hash operation), passwords, Secure Socket Layer (SSL), Secure Hypertext Transfer Protocol (HTTPS), HMACs and/or the like. Employing such encryption security protocols, the server 50 may encrypt all incoming and/or outgoing communications. If the decoded data is found to be signed by HMACs, the session can be approved and accordingly, an attestation ticket and/or session certification can be generated.

The server 50 may be associated with a secure enclave unit (not shown) that may represent any logic, circuitry, hardware, or other structures for creating and maintaining a secured, protected, or isolated environment, in which an application or other software may run, execute, be loaded, or otherwise be present an information processing system. The secure enclave unit may further include encryption unit (not shown), which may include any logic, circuitry, or other hardware to execute any one or more encryption algorithms and the corresponding decryption algorithms, and may include logic, circuitry, or other hardware shared with another encryption unit in processor. In one embodiment, the secure enclave unit includes keys such as HSM keys.

Furthermore, the communicative instructions may be stored and/or transmitted in batches (e.g., batches of instructions) as programs and/or data components to facilitate desired operations.

The server 50 is also shown to include failover unit (not shown). If one component or an entire server goes down, the server 50 can allocate the processes, especially critical processes like validation of the session, to another processor. A failover is the process of allocating a resource group (or application) to another node according to a failover policy. A failover may be triggered by the failure of a resource, a change in the node membership (such as when a node fails or starts), or a manual request by the administrator. The high availability network includes a plurality of servers connected by a first network, wherein the servers communicate with each other to detect server failure and transfer applications to other servers on detecting server failure through a process referred to as "failover".

The server 50 also includes a traffic controller (not shown) to receive tickets from all devices and delegate to another server or component within the server, for example to a server in a particular location, or associated with high-risk devices such that the commands are different, and so on. The controller receives the tickets and analyzes a header filed or user information to determine where it should be routed.

Figure 1B:
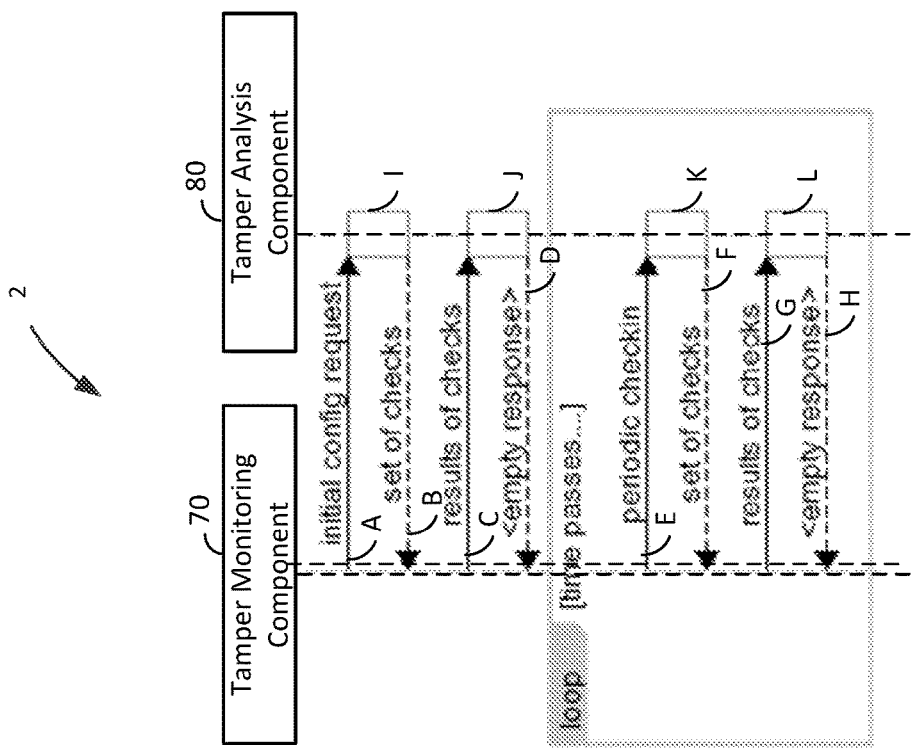
FIG. 1B is an illustrative block diagram of a timing flow between a payment server and the card reader in accordance with some embodiments of the present disclosure.

FIG. 1B depicts illustrative method flow 2 between the tamper monitoring component 70 in the payment device 3 and the tamper analysis component 80 in the payment server 40, in accordance with some embodiments of the present subject matter. It will be understood that in some implementations, both the tamper monitoring component 70 and the tamper analysis component 80 reside in a single entity, e.g., either the payment device 3, the payment terminal 20, or the payment server 40. The method flow 2 may be executed when a new payment reader is connected to terminal following a registration process, an existing payment reader, already registered with the server, is connected to a new or existing terminal, or an existing reader is connected to an existing terminal and is enabling transactions as usual.

Referring to method flow 2, the tamper monitoring component 70 uses an HTTP endpoint to communicate with tamper analysis component 80 in a server. Because it happens over HTTP, this is structured as a request from tamper monitoring component 70 followed by a response from tamper analysis component 80. However, logically it can be more like a command from tamper analysis component 80 followed by a result from tamper monitoring component 70. In some implementations, the tamper monitoring component 70 may communicate internally with a component that performs behavioral analysis and tamper detection on the device 3. Even though the description here shows the interaction between two components, it will be understood that other components contribute in completion of certain tasks.

In the method flow 2, when a reader 3 is first connected to the terminal and a registration process is started to initiate payment transactions, the tamper monitoring component 70 determines the device profile that can be associated with the reader 3. For this, in one implementation, the reader 3 works with the routines or instructions sent by a server component, such as tamper analysis component 80. For example, the tamper analysis component 80 can instruct the tamper analysis component 70 to obtain the location data from a location sensor associated with the reader 3. In another example, the instructions may related to temperature, pressure or voltage variations experienced on a particular trace or part of the reader.

The same or similar method flow 2 can be executed for attestation of a reader 3. For example, if an existing reader, that is reader already registered with the payment server 3, is reintroduced in an environment, that is connected to the same terminal to which it used to be connected, or connected to a new terminal, the reader can send its device profile to be attested by the server. The server 40 determines validity of the device profile and sends back an attestation ticket with updated validity criteria if device profile need not be computed from scratch. However, the device profile may, in certain cases, be required to be re-computed. In such cases, the attestation ticket is not generated or attestation ticket with restrictions may be sent back to the device.

Referring to the flow for device profile determination, the tamper monitoring component 70 sends a request (a) on startup, (b) whenever it has data to send, and (c) every few minutes; this gives tamper analysis component 80 regular opportunities to send new commands. As shown, at A, the tamper monitoring component 70 sends an initial request for configuration, behavioral analysis or tamper attestation based on the behavioral analysis. At I, the tamper analysis component 80 generates the routine. At B, tamper analysis component 80 sends a device profile command or routine (say scan the entire device for a certain malware or jailbreaking sign, obtain environmental parameters, such as location, temperature variations, monitor voltage variations on certain traces, etc.) for tamper monitoring component 70 to execute. At C, the tamper monitoring component 70 generates results of the device profile command to tamper analysis component 80, which are analyzed at J and responses, for example, device profile specific to the reader can be sent using D to the tamper monitoring component 70. The device profile may indicate the conditions that qualify as tamper events and non-tamper or tamper-like events, and the ways in which the devices should respond to the tamper events and tamper-like events.

In some cases, the device profile may be updated periodically or as and when a request is received. The method flow is similar to A-D, and is shown through steps E-H, K, and L.

Referring to the flow of attestation, once an existing reader reconnects either to the same terminal or a new terminal, the server may attest the device profile. For this, the attestation command at B may be different from the device profile command, as the idea is to recomputed the device profile only if required. For all other cases, the existing device profile is attested for current set-up. For example, the attestation command may include determining when the device profile was created and if the set-up is similar to the past set-up, and if any environment variables have drastically changed from the time the last profile was created. The server can then deny or approve the attestation or session validation can be sent using D to the tamper monitoring component 70.

In both cases, i.e., at the time of device profile determination and attestation of the device profile, the process may be repeated several times or until a certain number of commands are executed or responses are obtained. The commands can be configured based on the requesting device, merchant, location, and the like. Furthermore, the tamper monitoring component can check with the tamper analysis component at predetermined time intervals to verify that the ticket or session certificate is valid. This is shown through the loop section of the figure. The server sends a command and generates a new command when the response to the first command is received. This messaging having multiple exchange protocol can be useful if the fraudster is trying to hack into the system and trying to determine a pattern. Thus, in one example, it can be a five-step decision tree with five cycles of information exchange. The responses to the commands can help filer a bad actor from a good actor. The same type of attestation ticket can be sent to both devices so that a fraudster cannot reverse-engineer. The tamper monitoring component and detection component 70 and 80 can also engage in periodic check-ins to either update the status of attestation ticket or to send state data for better analysis. Every "frame", or package of data from component 70, is saved to HDFS for future analysis. Particularly suspicious frames can be reviewed with immediate attention. Some devices that have generated more suspicious frames than a threshold level can be denied request for attestation.

As a variation, the component 70 can send all its device specifications at once along with the request for device profile. Also, as shown, in this implementation, periodic check-ins are replaced by a one-time dispatch of device specifications, based on which the tamper analysis component 80 generates the commands for attestation. Accordingly, the component 80 generates commands and follows-up with additional if required.

Figure 2:
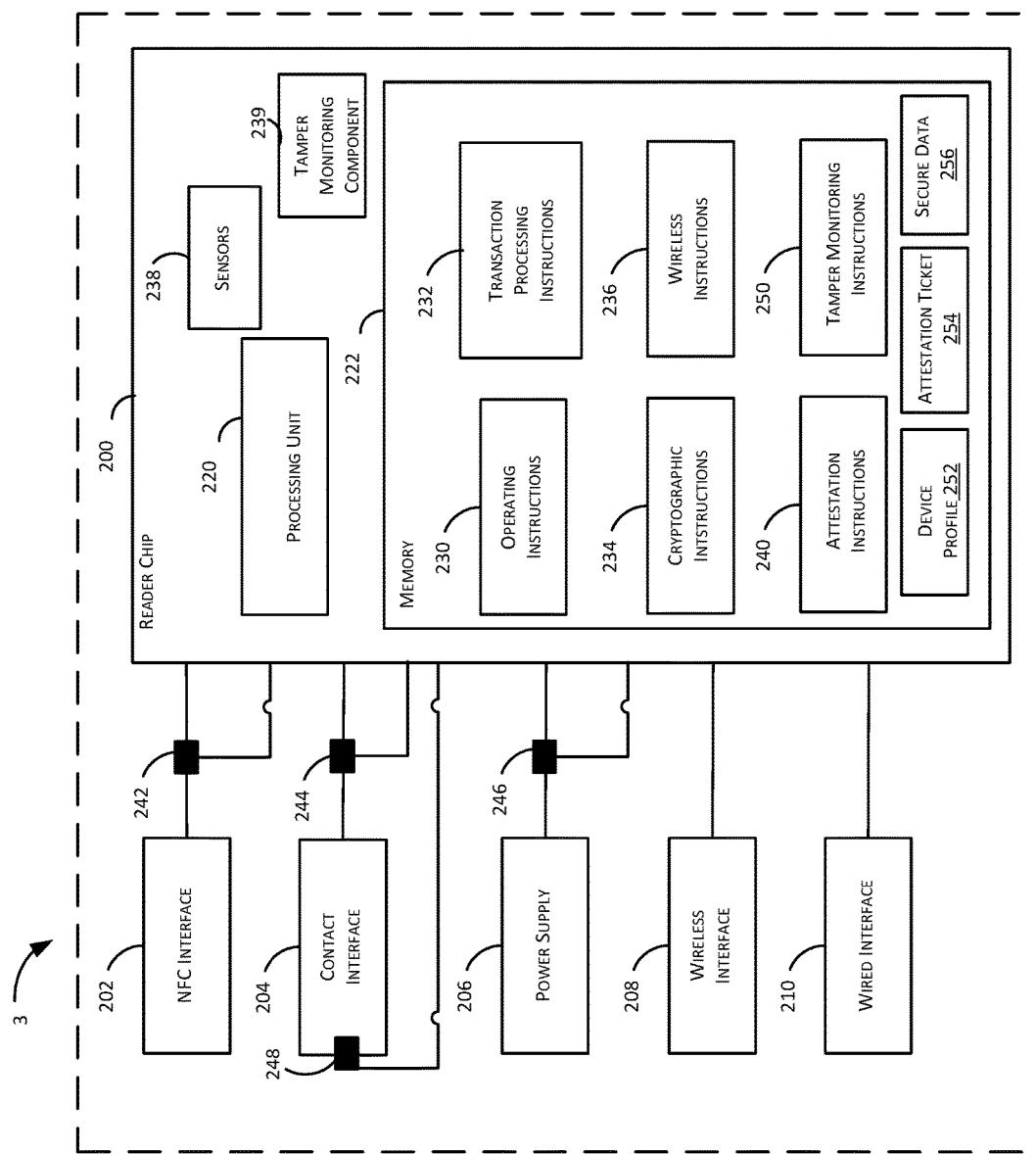
FIG. 2 is a high-level block diagram of the card reader in which the tamper detection technique can be implemented in accordance with some embodiments of the present disclosure.

FIG. 2 is a high-level block diagram of the payment device, such as payment device 3, in which the tamper detection technique can be implemented. In one embodiment, payment object reader 3 may be a wireless communication device that communicates wirelessly with an interactive electronic device such as a payment terminal 20, for example, using Bluetooth classic or Bluetooth low energy. Although particular components are depicted in a particular arrangement in FIG. 2, it will be understood that payment object reader 3 may include additional components, one or more of the components depicted in FIG. 2 may not be included in payment object reader 3, and the components of payment object reader 3 may be rearranged in any suitable manner. In one embodiment, payment object reader 3 includes a chip 400, a plurality of card reader interfaces (e.g., a NFC interface 202 and a contact interface 204), a power supply 206, a wireless communication interface 208, and a wired interface 210. Payment object reader also includes a processing unit 30 and memory 32. Although in one embodiment the processing unit 30 and memory 32 will be described as packaged in a chip 400 and configured in a particular manner, it will be understood that processing unit 30 and memory 32 may be configured in any suitable manner to perform the functionality of the payment object reader 3 as is described herein. It will also be understood that the functionality of chip 400 may be embodied in a plurality of chips, each including any suitable combination of processing units and memory to collectively perform the functionality of chip 400 as described herein. The memory may also be referred to as security component since secure data related to customers and merchants, including financial data may be locally and intermittently be stored in a secure enclave within the memory 32.

Payment object reader 3 may also include a plurality of monitoring components, each of which is associated with and monitors one or more components of payment object reader 3, such as sensors 240 and tamper monitoring component 239. The tamper monitoring component 239 may further include a tamper mesh with traces. On determining that a tamper event has occurred, the tamper monitoring component 239 through implementation of the attestation instructions 240 and tamper monitoring instructions 250, delete contents of the memory, for example, the attestation ticket or secure data 256 including financial data collected from merchants. Although particular monitoring components may be described with respect to certain embodiments of the present disclosure, it will be understood that a monitoring component may include any suitable mechanical components, sensors, switches, hardware, processing units, or any other suitable components necessary to monitor information about components of payment object reader 3. Although monitoring components may be associated with any suitable components of payment object reader 3, in some embodiments NFC monitoring component 242 may be associated with NFC interface 202, contact monitoring component 244 may be associated with contact interface 204, power supply monitoring component 246 may be associated with power supply 206, and chip card detection component 248 may be associated with contact interface 204.

Processing unit 220 of chip 400 of payment object reader 3 may include any suitable hardware, software, memory, and circuitry as is necessary to perform and control the functions of payment object reader 3. A processing unit 220 may execute instructions stored in memory 222 of chip 400 to control the operations and processing of payment object reader 3. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

In an exemplary embodiment, the processing unit 220 of chip 400 may include two RISC processors configured to perform general processing and cryptographic processing functions based on instructions stored in memory 13, respectively. As used herein, memory may refer to a tangible or non-transitory storage medium. Examples of tangible (or non-transitory) storage medium include disks, thumb drives, and memory, etc., but does not include propagated signals. Tangible computer readable storage medium includes volatile and non-volatile, removable, and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Chip 400 may also include additional circuitry such as interface circuitry, analog front end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 210 (e.g., USB, Ethernet, FireWire, and lightning), circuitry for interfacing with other communication interfaces or buses (e.g., I2C, SPI, UART, and GPIO), circuitry for interfacing with a power supply 206 (e.g., power management circuitry, power conversion circuitry, rectifiers, and battery charging circuitry), and circuitry for interfacing with a contact interface 104 (e.g., power and communication circuitry for directly interfacing with an EMV chip of a chip card 10).

In one embodiment, analog front end circuitry of chip 400 includes circuitry for interfacing with the analog components of NFC interface 202 (e.g., electromagnetic compatibility (EMC) circuitry, matching circuits, modulation circuitry, and measurement circuitry).

Security circuitry 239 of chip 400 may include circuitry for protecting sensitive information such as encryption keys, merchant information, and customer information, as well as circuitry for responding to fraudulent transactions and tamper attempts (e.g., by taking corrective action). In one embodiment, security circuitry may include tamper protection circuitry and electronic fuses for selectively cutting off power or disabling one or more components of chip 400 in response to attempts to obtain improper access to chip 400, tamper with the payment object reader 3, or engage in fraudulent transactions. Security circuitry may cause power to be removed from components or for components to be disabled. The removal or power or disabling of components may be either permanent or temporary, which may vary based on the severity of a security threat. In some embodiments, security circuitry may include circuitry to provide electrical signals to components of payment object reader 3. Electrical signals may be provided to cause a particular response by the component of the payment object reader 3 (e.g., erasure of information, temporarily disabling a component, modifying operation of a component, or causing any other suitable response), or to impact a device or component that is coupled to or in communication with payment object reader 3. For example, in an embodiment an electrical signal (e.g., a signal having a particular voltage, current, waveform, etc.) may be provided to cause damage to a device that is attempting to intercept payment information or inject signals into the payment object reader 3 (e.g., a fraudulent EMV card or tamper device coupled to the contact interface 204). Security circuitry may also include circuitry that causes erasure, encryption, obfuscation, or other actions to be performed on sensitive information when a possible tamper attempt or fraudulent transaction is detected.

In one embodiment, monitoring component circuitry 239 may include circuitry for interfacing with any of the monitoring components (e.g., monitoring components 242, 244, 246, and 248), such as signal conditioning circuitry, control circuitry, analog-to-digital conversion circuitry, digital-to-analog conversion circuitry, circuitry for measuring inductance or capacitance, timing measurement circuitry, any other suitable circuitry, or any combination thereof.

NFC interface 202 may provide for NFC communication with a contactless device such as NFC device or chip card. Based on a signal provided by chip 400, an antenna of NFC interface 202 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment object reader 3 is inductively coupled to a contactless device, the contactless device may also modulate the carrier signal, which may be sensed by the NFC interface 202 and provided to the chip 400 for processing. Based on these modulations of the carrier signal, payment object reader 3 and a contactless device are able to communicate information such as payment information.

NFC monitoring component 242 may monitor any suitable electrical characteristics of NFC interface 202. In some embodiments, NFC monitoring component 242 may provide a signal path to provide one or more analog signals directly to chip 400, circuitry (e.g., sensors) for determining information about devices that are in proximity to NFC interface 202, circuitry (e.g., sensors) for providing measurements related to the NFC interface (e.g., signal-to-noise ratios, modulation ratios, energy levels, etc.), any other suitable monitoring component, or any combination thereof. These monitored aspects of NFC interface 202 may provide information that is indicative of attacks, such as the presence of improper devices in proximity to NFC interface 202 while payment information is being exchanged, abnormal modulations of the wireless carrier signal, or attempts to bypass or tamper with the NFC interface 202.

Contact interface 204 may be a suitable interface for providing power to a payment chip such as an EMV chip of a chip card and communicating with the EMV chip. Contact interface 204 may include a plurality of contact pins (not depicted in FIG. 3) for physically interfacing with the chip card according to EMV specifications. In some embodiments, contact interface 204 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment object reader and the chip card are able to exchange information such as payment information.

Contact monitoring component 244 may monitor any suitable electrical characteristics of contact interface 204. In some embodiments, contact monitoring component 244 may provide a signal path to provide one or more analog signals directly to chip 400, such as from one or more of the pins of contact interface (e.g., an analog version of the signal that is seen at the I/O pin of the contact interface 104). Contact monitoring component 244 may also include circuitry (e.g., sensors) for providing measurements related to the contact interface (e.g., voltage, current, capacitance, inductance, or any other suitable electrical measurement at one or more of the pins of the contact interface 204), any other suitable monitoring component, or any combination thereof. These monitored aspects of contact interface 104 may provide information that is indicative of attacks, such as the insertion of a counterfeit card into an EMV slot (e.g., based on measured electrical characteristics at one or more pins of contact interface 204), the presence of an improper device intercepting information exchanged with a legitimate chip card via contact interface 204 (e.g., on the I/O pin), or the use of a device that simulates an EMV card (e.g., based on abnormal waveforms on the I/O line).

Chip card detection component 248 may also be associated with contact interface 204, and may provide electrical and mechanical components for determining when a chip card is inserted in EMV slot. In some embodiments, chip card detection component 248 may include one or more mechanical devices (e.g., switches) that are activated when a chip card meeting EMV card physical specifications (e.g., size, thickness, etc.) is inserted into the EMV slot. In some embodiments, chip card detection component 248 may include one or more sensors that sense information about the physical structure of the inserted card, such as size or materials. In some embodiments, chip card detection component 248 may include one or more electrical lines or sensors that provide information about the EMV chip of the inserted card, or in some embodiments, respond in a different manner when a measured electrical signal does not correspond to EMV specifications. It will also be understood that any other suitable chip card detection component 248 may be utilized in accordance with the present disclosure, and that a variety of types of chip card detection components 148 may be used in combination.

Power supply 206 may include one or more power supplies such as a physical connection to AC power or a battery. Power supply 206 may include power conversion circuitry for converting AC power and generating a plurality of DC voltages for use by components of payment object reader 3. When power supply 106 includes a battery, the battery may be charged via a physical power connection, via inductive charging, or via any other suitable method.

Power supply monitoring component 246 may monitor any suitable electrical characteristics of power supply 106. In some embodiments, power supply monitoring component 146 may provide a signal path to provide one or more analog signals directly to chip 400, such as from the power supply input, a battery, a charging circuit, power conversion circuitry, or any other suitable component of power supply 106. Power supply monitoring component 246 may also include circuitry (e.g., sensors 240) for providing measurements related to the power supply 206. These monitored power signals may provide information that is indicative of attacks, such as abnormal patterns of connections to a power supply or power usage patterns.

Wireless communication interface 208 may include hardware and software for communicating with external electronic devices using a wireless communication protocol such as Wi-Fi, Bluetooth classic, or Bluetooth low energy. In some embodiments, wireless communication interface 208 may allow payment object reader to communicate with one or both of merchant device 20 and payment server 40.

Wired interface 210 may include any suitable interface for wired communication with other devices or a communication network, such as USB, Lightning, FireWire, Ethernet, any other suitable wired communication interface, or any combination thereof. In some embodiments, wired interface 210 may allow payment object reader to communicate with one or both of merchant device 20 and payment server 40.

Memory 222 may include a plurality of sets of instructions for performing the processing operations of payment object reader 3, such as operating instructions 230, transaction processing instructions 232, cryptographic instructions 234, wireless communication instructions 236, tamper monitoring instructions 250, device profile 252, attestation ticket 254, and attestation routine 254, where the attestation routine 254 is obtained from a payment processing system, like payment processing system 50. Although not depicted in FIG. 2, in some embodiments sensitive information such as the cryptographic instructions 232, encryption keys, passwords, and other similar information may be stored in a logically and physically distinct memory from the other instructions and storage. Memory 222, or portions thereof, may be associated with a processor (e.g. a RISC processor), and may also be associated with particular hardware logic, such as hardware logic associated with electronic fuses, tamper protection circuitry, and cryptographic operations.

Operating instructions 230 may include instructions for controlling any suitable general operations of the payment object reader 3, such as internal communications, power management, processing of messages, system monitoring, sleep modes, user interface response and control, and the management of the other sets of instructions. In one embodiment, the operating instructions 230 may provide the operating system and applications necessary to perform most of the processing operations that are performed by the processing unit 220 of the chip 400 of payment object reader 3.

In addition, operating instructions 230 may include instructions for controlling the interaction between the payment object reader 3 and a payment object 10 (e.g., for interfacing with a payment device via the NFC interface 202 and contact interface 204). In one embodiment, the operating instructions may include instructions for generating a wireless carrier signal, providing the wireless carrier signal to NFC interface 202 (e.g., via analog front end circuitry), modulating the wireless carrier signal based on data to be transmitted according to a communication protocol, receiving a modulated wireless carrier signal from the NFC interface 202 (e.g., via analog front end circuitry), demodulating the received modulated wireless carrier signal according to a communication protocol, and determining received data from the demodulated signal. The operating instructions 230 may also include instructions for communicating with a chip card through an I/O line of contact interface 204.

Operating instructions 230 may also include instructions for interacting with a merchant device 20. In one embodiment, the merchant device 20 may be running a point-of-sale application. The operating instructions 230 may include instructions for a complementary application to run on processing unit 220 of chip 400, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment object reader 3 (e.g., via wireless interface 108, based on wireless instructions 236). The operating instructions 232 facilitate processing of the payment, for example, by acquiring payment information via the NFC interface 202 or contact interface 204, invoking the transaction processing instructions 232 and cryptographic instructions 234 to process that payment information, and by generating responsive messages that are transmitted to the point-of-sale application of the merchant device via wireless interface 108 based on wireless instructions 236.

Operating instructions 230 may also include instructions for interacting with a payment processing system 50 at a payment server 40. In one embodiment, a payment processing system 50 may be associated with the payment object reader 3 and the point-of-sale application of the merchant device 20. For example, the payment processing system 50 may have information about payment object readers 3 and merchant devices 20 that are registered with the payment processing system 50 (e.g., based on unique identifiers). This information may be used to process transactions with servers of the merchant and customer financial institutions, for providing analysis and reports to a merchant, and aggregating transaction data. The payment object reader 3 may process payment information (e.g., based on the transaction processing instructions 232 and the cryptographic instructions 234) and communicate that processed payment information to the point-of-sale application, which in turn communicates with the payment processing system 50. In this manner, messages from the payment object reader 3 may be forwarded to the payment processing system 50 of payment server 40, such that the payment object reader 3 and payment processing system 50 may collectively process the payment transaction. In some embodiments, the operating instructions may facilitate communication of messages related to fraud and tampering (e.g., based on the device profile 252 determined from tamper monitoring instructions 250 and attestation routine 240) with payment processing system 50. In this manner, payment object reader 3 and payment processing system 50 may interact to determine whether fraudulent transactions and tamper attempts are occurring, to determine corrective action to take in response to fraudulent transaction and tamper attempts, to update a transaction database (e.g., having compiled information for identifying fraudulent transactions and tamper attempts) of the payment processing system 50, and communicating updates regarding local test criteria used by the payment object reader 3.

Transaction processing instructions 232 may include instructions for processing payment transactions at payment object reader 3. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 220, these instructions may determine whether to process a transaction locally, how payment information is accessed from a payment device, how that payment information is processed, which cryptographic functions to perform, the types of communications to exchange with a payment server, and any other suitable information related to the processing of payment transactions.

Cryptographic instructions 234 may include instructions for performing cryptographic operations. Processing unit 220 may execute the cryptographic instructions to perform a variety of cryptographic functions, such as to encrypt, decrypt, sign, or verify a signature upon payment and transaction information as part of a payment transaction. Wireless communication instructions 236 may include instructions for communicating wirelessly with other devices such as an interactive electronic device (e.g., merchant device 220). Although wireless communication instructions 236 may be used for any suitable wireless communications interface 208, in one embodiment, the wireless communication interface 208 may be a Bluetooth interface (e.g., Bluetooth classic, Bluetooth low energy, or both) and the wireless communication instructions 136 may be for the operation of the Bluetooth interface. Processing unit 220 may execute the wireless communication instructions 236 to send and receive messages (e.g., in broadcast or connected modes) to communicate with the merchant device 20.

The tamper monitoring instructions 250, of the transaction monitoring component 239, may be obtained from a payment processing system, like payment processing system 50 and may include instructions for attesting and identifying fraudulent transactions, tamper attempts, and other attacks on a payment terminal 20 such as payment object reader 3. The tamper monitoring instructions 250 may perform any suitable operations when executed by processing unit 220, in some embodiments, fraud tamper instructions may operate monitoring components (e.g., monitoring components 242, 244, 246, and 248), process monitoring signals received from the monitoring components, monitor messages exchanged with a payment device, send request messages to test for fraud or tampering, process response messages received in response to the request messages, identify fraud or tampering based on local test criteria, communicate information that relates to fraud or tampering to a payment server 40 (e.g., payment processing system 50), receive fraud determination messages from a payment server 40 (e.g., payment processing system 50), and take corrective action based on the local test criteria and the fraud determination messages.

In some embodiments, tamper monitoring instructions 250 may include instructions for operating monitoring components (e.g., monitoring components 242, 244, 246, and 248). As described herein, a variety of types of monitoring components may be utilized in accordance with the present disclosure. The attestation routine 240 may provide instructions to control signals provided to monitoring component circuitry of chip 400, for example, to provide power, test signals, and other suitable signals to the monitoring components. In some embodiments, attestation routine 240 may provide instructions to control communication with one or more monitoring components, to provide control messages, receive data, or perform any other suitable functions with the monitoring components. In some embodiments, operating the monitoring components may include providing signals such as test signals or test waveforms to one or more of the monitoring components. For example, in one embodiment a test waveform may be provided to the I/O line of the contact interface 104 via monitoring component 244.

In some embodiments, attestation routine 240 may provide instructions to process monitoring signals received from the monitoring components. Monitoring signals may be received at chip 400 (e.g., via monitoring component circuitry) in a variety of forms, including analog signals, digital signals, and data signals. The attestation routine 240 may provide instructions for processing unit 220 to extract useful data from the received monitoring signals. In some embodiments, extracting useful data may include measuring some aspect of the monitored signal, such as voltage, current, impedance, capacitance, power, energy, waveform shape, etc. In an embodiment, contact monitoring component 244 may receive and monitor the analog signal on the I/O line of the contact interface 204, thus monitoring an output signal transmitted by the chip 400 and an input signal received via contact interface 104 during EMV communications. In some embodiments, the monitored signal may be digital or may be converted into a digital signal by an analog-to-digital converter. In some embodiments, attestation routine 240 may provide instructions for communicating with a monitoring component by exchanging data, for example, by communicating with monitoring components such as sensors over a data line or communication bus.

In some embodiments, attestation routine 240 may provide instructions to monitor messages exchanged with a payment object 10. For example, messages may be exchanged with a payment device via NFC interface 202 or contact interface 204. Processing unit 220 may generate and receive those messages, as described herein, and attestation routine 240 may include instructions for monitoring those messages and aspects of those messages, such as their content, sequence, and timing. In some embodiments, the messages may be monitored along with information received from one or more of the monitoring components. For example, the timing of messages that are sent and received over the I/O line via contact interface 204 may be determined based on a monitored signal received from contact monitoring component 244.

In some embodiments, attestation routine 240 may provide instructions to send request messages to test for fraud or tampering. Rather than merely monitoring the normal message flow during a payment transaction, attestation routine 240 may provide instructions for chip 400 to send request messages that are used to test for tamper devices and counterfeit cards, which may respond differently than properly functioning cards in response to atypical messages. In some embodiments, additional messages (e.g., error condition test requests) may be inserted into the normal messaging scheme for exchanging payment information between a payment device and the payment object reader. In other embodiments, messages that do not comply with the messaging protocol (e.g., error condition test requests) may be transmitted to the payment object 10. EMV cards that have not been compromised may have known behaviors, e.g., based on the card issuer or manufacturer.

In some embodiments, messages can be sent to test the functioning of the underlying circuitry of the payment device. For example, numerous requests (e.g., random number test requests) may be made for information that includes random numbers. The results may then be tested for randomness. As another non-limiting example, numerous requests may be made in succession, which may test the processing speed and capability of a chip card (e.g., message timing test requests), with any abnormal results likely to correspond to a counterfeit card or tamper device.

In some embodiments, attestation routine 240 may provide instructions to process response messages received in response to the request messages. For example, response messages may be associated with a timestamp (e.g., based on data acquired by a monitoring component or based on timing established by message content or by processing unit 202). In some embodiments, data such as a random number may be extracted from the message, or response messages may be associated with request messages.

In some embodiments, attestation routine 240 may provide instructions to identify fraud or tampering based on local test criteria. Although fraud or tampering may be identified based on any suitable information, in some embodiments fraud or tampering may be identified based on monitored signals acquired from the monitoring components, monitored responses, monitored timing, transaction information, payment information, or any combination thereof. Local test criteria may be criteria such as thresholds or logical tests that are available to run locally at the same payment terminal 20 device that is interfacing with the payment object 10 on which the (e.g., at a payment object reader 3 device that interfaces with NFC device or chip card). Local test criteria may allow the payment terminal to respond quickly to certain types of fraudulent transactions and tamper attempts, without having to communicate with another device such as a payment server 40 (e.g., a payment processing system 50).

In some embodiments, local test criteria may be updated (e.g., by insertion of a memory device into a port of the payment terminal 20, receiving an update message over a network, or any other suitable manner for providing updates). Processing unit 220 may receive the update and update the local test criteria by modifying the attestation routine 240. Local test criteria may also change based on local conditions, which may be determined based on any suitable inputs (e.g., time, location, merchant code, presence of a network connection, etc.). For example, the local test criteria may be modified (e.g., strengthened) if a payment terminal 20 is not connected to a network, and thus cannot communicate with a payment server 40 to receive fraud determination messages.

One exemplary local test criteria may be a timing test, which may be based on the timing of messages that are exchanged between payment terminal 20 and payment object 10 (e.g., messages exchanged pursuant to an EMV protocol or message timing requests intended to test the timing of particular responses). A tamper device or counterfeit card may not respond within the normal timing patterns as a result of manufacturing, or as the result of an attack (e.g., a relay attack). As described herein, information about the timing may be obtained, for example, based on monitored timing from a monitoring component. A timing test may be performed in a variety of manners. In some embodiments, the time to receive particular response messages (e.g., in an EMV protocol, an answer to reset (ATR) message, an authorization request cryptogram (ARQC) message, etc.) may be compared to a range or threshold. If the timing does not fall within the range or meet the threshold, the timing test may register as a failure. In some embodiments, other aspects of message timing may be considered, such as the relative time it takes for the card to send different message types, overall time to process transactions, etc.

Another exemplary local test criteria may be an error condition test. As described herein, in some embodiments error condition test requests may be transmitted and the timing and content of the responses may be monitored. A tamper device or counterfeit card may respond differently to error condition test requests than an actual chip card. In some embodiments, the monitored timing to respond may be compared to a range or threshold, the content of a response or set of responses may be checked against a logical test, or any combination of these and other techniques may be used to perform the error condition test. An exemplary error condition test may check to see if a response message was received, determine whether the time to receipt exceeds a threshold, and check the response content against expected response content.

Another exemplary local test criteria may be a random values test. A tamper device or counterfeit card may not produce random numbers as well as an actual chip card. As described herein, in some embodiments payment terminal 20 (e.g., chip 400 of payment object reader 3) may transmit random number test requests to a payment device (e.g., a chip card via the contact interface 204 of payment object reader 3) and receive responses. Random numbers or other information that is based on a random numbers may be extracted from the responses. Statistical tests may be performed on the received random numbers to determine whether they are in fact likely to be random or whether there is a high probability that the values of the responses are not random.

Another exemplary local test criteria may be an electrical characteristics test. A tamper device or counterfeit card may impact electrical signals of a payment terminal 20 (e.g., payment object reader 3) or may produce electrical signals that are different from expected electrical signals. For example, electrical characteristics (e.g., voltage, current, impedance, capacitance, power, energy) of any of the pins of the contact interface 204 (e.g., the VCC pin, GND pin, RST pin, CLK pin, VPP pin, and I/O pin) may be determined from a monitoring component such as contact monitoring component 244. In some embodiments, a test waveform may be transmitted to one or more of these pins. One or more of the electrical characteristics may be compared to a range or threshold, and in some embodiments, statistics may be calculated from the electrical characteristics. The comparison or statistics may be used to identify a fraud or tamper attempt. For example, in an embodiment the contact monitoring component 244 may monitor the I/O line of contact interface 204. An analog monitoring signal provided by the contact monitoring component 244 may be converted to a digital signal (e.g., using an analog-to-digital converter). Processing unit 220 of chip 400 may analyze the waveform (e.g., shape, duty cycle, rise time, fall time, frequency, phase, etc.) of the digitized I/O line signal based on ranges or thresholds from the attestation routine 240 to determine whether there is likely to be a counterfeit card or tamper device at the contact interface.

Another exemplary local test criteria may be a card insertion test. During fraudulent transactions or tamper attempts, a tamper device or counterfeit card may not be present at appropriate times, may be present at inappropriate time, or may not have physical packaging (e.g., shape, material, etc.) that complies with specifications. In one embodiment, chip card detection component 248 may provide a detection signal indicating whether the chip card is detected, or in some embodiments, providing information (e.g., related to physical packaging) about an inserted chip card. Processing unit 220 of chip 400 may analyze the received detection signal in view of other information (e.g., monitored timing, response messages, electrical characteristics, etc.) to determine whether detection signal indicates that fraud or a tamper attempt is likely occurring (e.g., a detected card exceeding a threshold insertion time, while sending messages that do not result in a completed payment transaction).

Another exemplary local test criteria may be a power supply test. During fraudulent transactions or tamper attempts, a payment terminal 20 (e.g., a payment object reader 3) may remain powered on for an abnormal period of time (e.g., an extended period of time) or in abnormal patterns. In an embodiment, power supply monitoring component 146 may monitor power supply 106, and processing unit 220 of chip 400 may analyze the monitored power supply signal (e.g., based on thresholds, ranges, patterns, statistics, or other monitored signals) to determine whether fraud or a tamper attempt is likely occurring.

The memory 22 can perform one or more security operations instructed by the CPU 220 (e.g., operations involving sensitive information or data). The one or more security operations can include, for example, storing an encryption key in the memory 222 as secure data and/or using the encryption key to encrypt sensitive information received by the device 200. In some embodiments, the tamper monitoring component 239 can perform a security operation on its own initiative, without instruction from the CPU 102, for example, performing an erase of the memory 222 (e.g., in response to tampering detected by the tamper monitoring component 239). The internal power supply 206 is dedicated to provide voltage to the traces of the tamper monitoring component 239 for carrying out the various operations involving the sensitive data 256. The internal power supply 206 has a smaller capacity of power than the main power supply (not shown), which is responsible for supplying voltage to the CPU 220 (in addition to other components of the electronic device 200). The internal power supply 206 can be, for example, a "coin cell" type battery.

The tamper monitoring component 239 includes a first detector/node and a second detector/node. The first detector is connected to one or more first conductive traces, where the first conductive traces 230 are coupled to the internal power supply of the tamper monitoring component 239 to facilitate tamper detection, the nature of which will be discussed in further detail below. The second detector is connected to one or more second conductive traces to obtain data which is further used to determine behavior of the reader over time. Both tamper detection and data collection for behavior or reader profile can be collected using the local test criteria mentioned above.

In some embodiments, attestation routine 240 may provide instructions that cause a payment terminal 20 (e.g., payment object reader 3 of payment terminal 20) to communicate information that relates to fraud or tampering to a payment server 40 (e.g., payment processing system 50, via merchant device 20 and network 30). As described herein, a payment terminal 20 may determine electrical characteristics based on signals and data received from monitoring components, may receive responses based on requests provided to a payment device, and may monitor timing of the functioning of the payment terminal (e.g., of monitored responses). In some embodiments, local test criteria may be used to determine fraud or a tamper attempt locally at the payment terminal 20. In some embodiments, some or all of the fraud and tamper detection may be performed remotely from the payment terminal 20 (e.g., the payment object reader 3). Thus, in some embodiments a server request message may be generated and sent to the payment server 40 (e.g., payment processing system 50). The server request message may include any suitable information, such as monitored electrical characteristics, monitored timing, monitored responses, statistics determined therefrom, transaction information, information about the payment terminal (e.g., location, etc.), environmental information (e.g., temperature, etc.), preliminary assessments based on local test criteria, or any suitable combination thereof. In some embodiments, the server request message may only be sent if the local test criteria indicate that there is likely to be a fraudulent transaction or tamper attempt, for a subset of local test criteria, or based on the severity of a possible fraudulent transaction or tamper attempt.

In some embodiments, attestation routine 240 may provide instructions to receive fraud determination messages from a payment server 40 (e.g., payment processing system 50). As described herein, a payment server 40 (e.g., payment processing system 50) may utilize the information provided in server request messages to determine whether a fraudulent transaction or tamper attempt is occurring, and may respond with a fraud determination message (e.g., by transmitting the fraud determination message to payment object reader 3 via network 30 and merchant device 20). The attestation routine 240 may cause processing unit 220 of chip 400 to extract information from the fraud determination message, such as an indication that a fraudulent transaction or tamper attempt is occurring, information about the type of fraudulent transaction or tamper attempt, and instructions regarding a type of corrective action to perform.

In some embodiments, attestation routine 240 may provide instructions for taking corrective action based on the local test criteria and the fraud determination message. Although any suitable corrective action may be taken, in some embodiments corrective action may include aborting a transaction (e.g., ceasing communications with a payment object 10), temporarily or permanently removing power or disabling one or more components of the payment terminal 40 (e.g., using tamper protection circuitry, security circuitry, or electronic fuses), querying the payment object 10 (e.g., sending request messages) to gather additional information about the fraudulent transaction or tamper attempt, or employing countermeasures (e.g., utilizing security circuitry to switch a high current to the I/O line of the payment object 10 via contact interface 104) in an attempt to damage the counterfeit card or tamper device.

As mentioned previously, the results of the attestation routine 240 are obtained as attestation data and sent to the payment terminal and then to the payment processing system for generation of an attestation ticket that indicates that the reader is secure for all future transactions.

According to the embodiment, the electronic device 200 includes a housing (not shown) to protect one or more circuit boards (not shown) within the device 200, where the circuit boards contain various electrical components that carry out the functions of the device 200, such as the CPU 202, the security component 222, etc. In this regard, disposed within the electronic device 200 at various locations are one or more of the first and second conductive traces to facilitate the tamper detection. In some embodiments, a particular conductive trace (e.g., as shown in FIGS. 4A and 4B) is disposed at least partially along one or more interior surfaces of the housing. In some embodiments, the particular conductive trace is disposed at least partially along one or more circuit board layers within the electronic device 200. In some embodiments, the particular conductive trace is disposed within a particular electrical component of the electronic device 200.

A conductive trace, or a conductor can include, for example, one or more metal wires or metal traces (e.g., of the type formed through a deposition-and-etch process). As used here, the term "trace" refers to any form of conductive path. In some embodiments, a conductive trace can include a metal dome switch that is affixed to an interior surface of the housing. The metal dome switch, which can be any conventional switch contact used to produce a positive tactile feedback, may be used to detect tampering through detection of an "undepressed" physical state of the switch caused by an opening of the housing. In some embodiments, the conductive traces 230 can form one or more conductive loops, collectively referred to as a conductive "mesh."

As briefly discussed above, the conductive trace(s) are different in how each is utilized to detect tamper detection (i.e., the introduced technique versus traditional technique(s)). In some embodiments, the two different conductive traces are both disposed within the electronic device 100, where they may be physically connected or physically separate from each other. In some embodiments, the two different conductive traces are interwoven and disposed in close proximity and spatially parallel to each other. Detail of various configurations utilizing the first and second conductive traces to detect tampering will be discussed, in accordance with various embodiments of the introduced technique.

Each of the conductive traces is coupled to a detector (i.e., tamper monitoring component 239), which can detect an open-circuit condition, a short-circuit condition, or both, on each respective trace. For example, if an attempt to drill into or open the electronic device 100 breaks the first conductive trace or connects several of the conductive traces, an open-circuit or short-circuit condition will result and will be detected by the detector.

According to the disclosed technique, the tamper monitoring component 239 can detect a short-circuit condition on the first conductive trace by virtue of an electrical connection between the tamper monitoring component 239 and the trace at a node (not shown). The node is an electrical node at which a voltage, having value Vs' volts, is delivered via a resistance (not shown) from the internal power supply 206 of the security component 222. The connection at the node enables the tamper monitoring component 239 to utilize the voltage from the internal power supply 206 as a tamper detection signal. The power supply voltage "signal" can be utilized for tamper detection in different embodiments, as will be discussed in subsequent figures.

The tamper monitoring component 239 can detect an open-circuit condition by using traditional tamper detection techniques that provide a tamper detection signal through an electrical connection with the second conductive trace, which is not connected to the internal power supply 210. In some embodiments, the tamper detection system 239 utilizes detection and sensing capabilities to render it difficult for an attacker to circumvent the different conductive traces of the electronic device 200. Details of how the short-circuit and open-circuit conditions may be detected are discussed below.

Further, in response to tamper detection, the tamper detection system 239 outputs a signal to the CPU 220 within the electronic device 200. In response to receiving the signal, the CPU 220 triggers an appropriate tampering countermeasure, such as disabling one or more operations of the security component 222 and/or one or more operations of the electronic device 200. For example, the CPU 220 can cause the security component 222 to delete an encryption key stored in the memory 112. In some embodiments, the security component 222 itself, in response to detecting tampering (through the tamper detection system 239), triggers a tampering countermeasure, such as erasing the memory 222 (and thereby preventing the sensitive data 256 from being acquired by an attacker).

The tamper monitoring component 239 also includes selection logic to determine which traces should be used for tamper detection and which traces should be reserved for collection of data to be later used for reader's behavior analysis. In some cases, the same trace is used for both purposes while in other implementations; different traces are used for different purposes outlined above. In some cases, different traces are used for tamper detection until the selection logic provisions a trace previously assigned for tamper detection to behavioral analysis. A clock (not shown) can set timing for when the trace should be enabled for tamper detection, behavior analysis or both and when to disable a certain trace known to be susceptible to tamper-like events.

FIG. 3A illustrates an interior surface of a housing 300, in which the reader, such as reader 3, may be enclosed, with an exemplary arrangement of tamper traces of varying voltages. In one implementation, the tamper monitoring component, for example tamper monitoring component 70, conducts electricity across conductive tamper traces 320 that snake around an interior surface of the security housing. The tamper traces 320 can be connected to the tamper monitoring component 70 in such a way that some of the tamper traces 320 conduct different voltages than other tamper traces 320.

Some of the tamper traces 320 of FIG. 3A are illustrated using solid lines, while others are illustrated using dashed lines. These are illustrated differently to illustrate different voltages that the tamper traces 320 are configured to convey.

The tamper traces 320 of FIG. 3 run over the components of the reader 3 including memory and other secure elements. The endpoints of the tamper traces 320, also referred to as housing connection nodes, are positioned along the connection areas. The housing connection nodes are identified numerically in FIG. 3, specifically numbered 360, 365, 370, 375, 380, 385, 390, and 395.

In particular, one tamper trace 320 of FIG. 3A runs from housing connection node 360 to housing connection node 375. Another tamper trace 320 runs from housing connection node 365 to housing connection node 370. Another tamper trace 320 runs from housing connection node 380 to housing connection node 395. The last tamper trace 320 of FIG. 3A runs from housing connection node 385 to housing connection node 390.

The tamper traces 320 of FIG. 3A are laid out to cover the entirety of the interior surface 305 of the housing, including the sidewall surfaces and the connection areas. The tamper traces 320 of FIG. 3A are laid out so that tamper traces 320 of different voltages run parallel to each other, so that a malicious party's metal drill bit boring through the housing 105 shorts out the tamper monitoring component 70 by connecting tamper traces 320 of differing voltages.

In one embodiment, one of the tamper traces 320, for example the tamper trace 320 that runs from housing connection node 360 to housing connection node 375, can be monitored to collect tamper related data, i.e., to determine whether an attempt is made to pry open the traces. Additionally, another tamper trace 320 running from housing connection node 380 to housing connection node 395, can be monitored to determine behavioral data over time, that is a profile of voltage and current variations over time. In one implementation, the tamper response is only triggered based on the data obtained from the traces monitored for tampering and not for behavioral analysis. The device 3 can also collect additional behavioral data from the environment through one or more sensors, where environmental data includes operating pressure, operating temperature, operating elevation, and the like, associated with the reader 3.

Figure 3B:
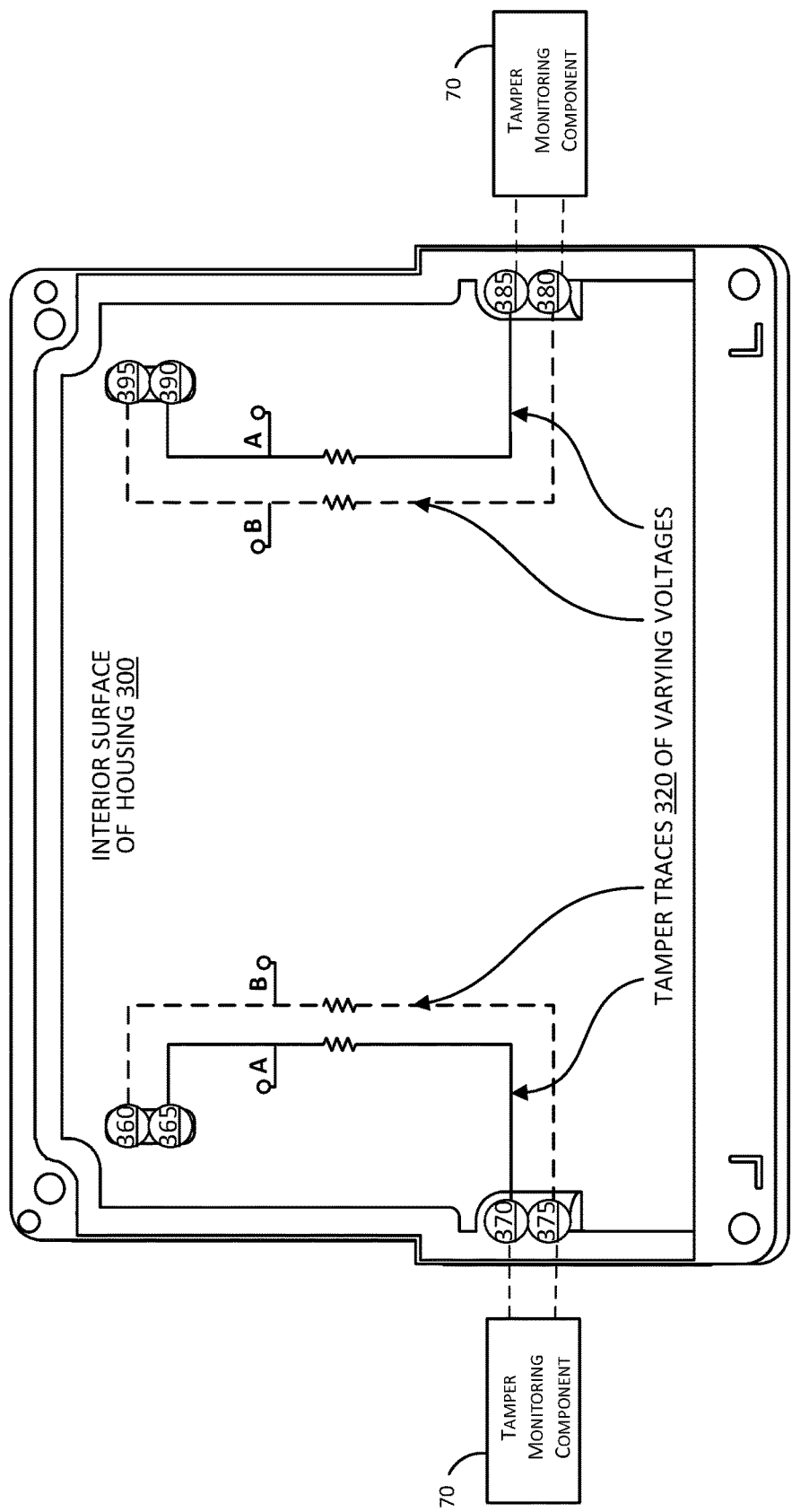
FIG. 3B is the interior surface of the housing for the card reader with an exemplary arrangement of tamper traces of varying voltages in accordance with some embodiments of the present disclosure.

FIG. 3B illustrates the interior surface of the housing with a schematic diagram of tamper traces of varying voltages as shown in the arrangement of FIG. 3A. The simplified arrangement of tamper traces 320 of FIG. 3B includes the same layout of tamper trace 320 endpoints as FIG. 3A. That is, a first tamper trace 320 of FIG. 3B runs from housing connection node 360 to housing connection node 375. Another tamper trace 320 runs from housing connection node 365 to housing connection node 370. Another tamper trace 320 runs from housing connection node 380 to housing connection node 395. The last tamper trace 320 of FIG. 3B runs from housing connection node 385 to housing connection node 390.

The tamper monitoring component 70 can allocate which traces to use to monitor for tamper events and which ones to monitor for determination of reader's custom device profile. According to the data received from the traces, the tamper monitoring component 70 then determines a device profile, which then dictates the threshold used by the tamper trace to detect whether or not a tamper event has occurred. At the time of registration, that is when a new reader is being registered with a terminal and a server, the device profile may be a default profile that asserts a default tamper threshold. However, as the tamper traces are monitored and device profile is set as per behavior of the trace with respect to environmental variations, the tamper threshold may be increased or decreased.

The tamper traces can be monitored using monitor nodes A and B, which are both connected to the tamper monitoring component 70. In some cases, the same trace can be used for monitoring tamper events and behavior. While one monitor node can be used to track tamper events, other node can be used to track behavior of the device over time. If certain traces are found to be more susceptible to variations due to environment, they may be disconnected from the tamper monitoring component 70.

Figure 3C:
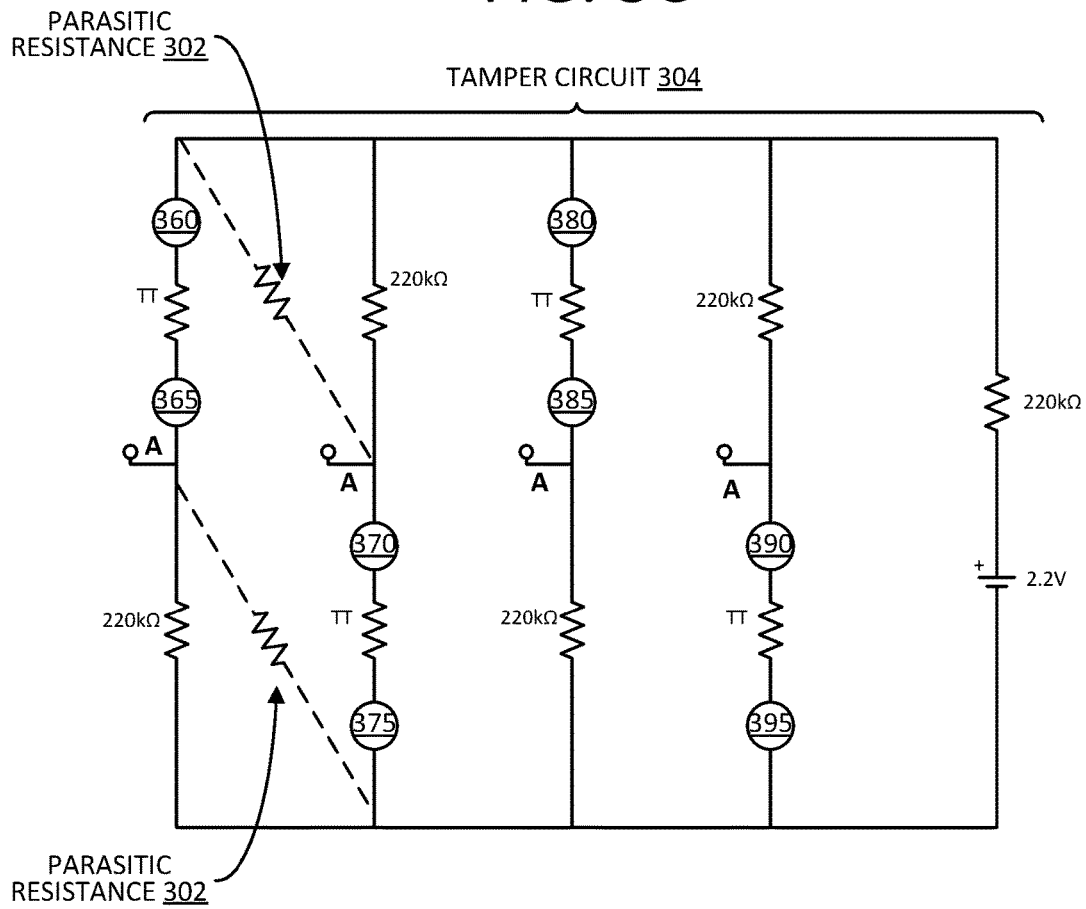
FIG. 3C is a circuit diagram illustrating a tamper circuit having monitoring nodes to detect tamper events and false positives.

FIG. 3C is a circuit diagram illustrating an arrangement of elements, for example as a discrete comparison tamper circuit. A legend 308 is included in FIG. 3C to interpret the circuit diagram.

The discrete comparison tamper circuit 304 is one layout of a compete tamper monitoring component 70. The discrete comparison tamper circuit 304 is powered by a power supply 305, which can optionally operate at 2.2 volts. The discrete comparison tamper circuit 304 includes four legs connected in parallel. Each leg includes a discrete resistor 320 connected in series with a tamper trace 320 acting as a resistor 310, with a monitor node 322 connected in series between the discrete resistor 320 and the tamper trace 320. The discrete resistors 320 can, for example, be 30 kilo-ohm (kΩ) resistors. The discrete comparison tamper circuit 304 of FIG. 3C also illustrates the positions of the housing connection nodes 335 within the circuit, including housing connection nodes 360, 365, 370, 375, 380, 385, 390, and 395.

The discrete comparison tamper circuit 304 includes four monitor nodes 322—one corresponding to each tamper trace 320. The monitor nodes 322 are monitored relative to ground. The tamper monitoring component 70 obtains data from the monitor nodes 322. The discrete comparison tamper circuit 304 can identify disconnections along tamper traces 320 by checking voltages at the monitor nodes 322.

As mentioned before, the discrete comparison tamper circuit 304 can have issues in certain environmental conditions. For example, in high heat or high humidity, a parasitic resistance 302 can develop between different legs of the discrete comparison tamper circuit 304. Two exemplary parasitic resistances 390 are illustrated in FIG. 3C. A parasitic resistance 302 develops between points on parallel legs that are not directly connected. The parasitic resistance 302 modifies the voltage monitored at the monitor nodes 330, producing a "false positive" indication of tampering when no tampering has occurred, potentially disabling the reader 3 as a result.

To this end, in one implementation, the monitor nodes 322, labeled A and B, track the variation of voltages on selected traces, while the monitor nodes B track the voltage on the traces and compare them to a tamper threshold to determine whether or not a tamper event has occurred. Again, both traces may be used for tamper detection or profile generation at the same time or different time intervals. Thus, the tamper monitoring component 239 can provision any trace for a purpose desired for that location or a certain time period. The monitor nodes A and B may operate simultaneously or in separate time windows. An internal clock can set the timing for the data collection and analysis. For example, the monitor nodes A may obtain data after the tamper data is obtained from monitor B. In another example, the monitor node A and B can both operate simultaneously. In yet another example, where the same trace is used and as such both monitor nodes A and B, the timing signal can indicate when to It will be understood that the monitor nodes A and B can be switched as and when dictated by the tamper monitoring component 70.

Figure 4:
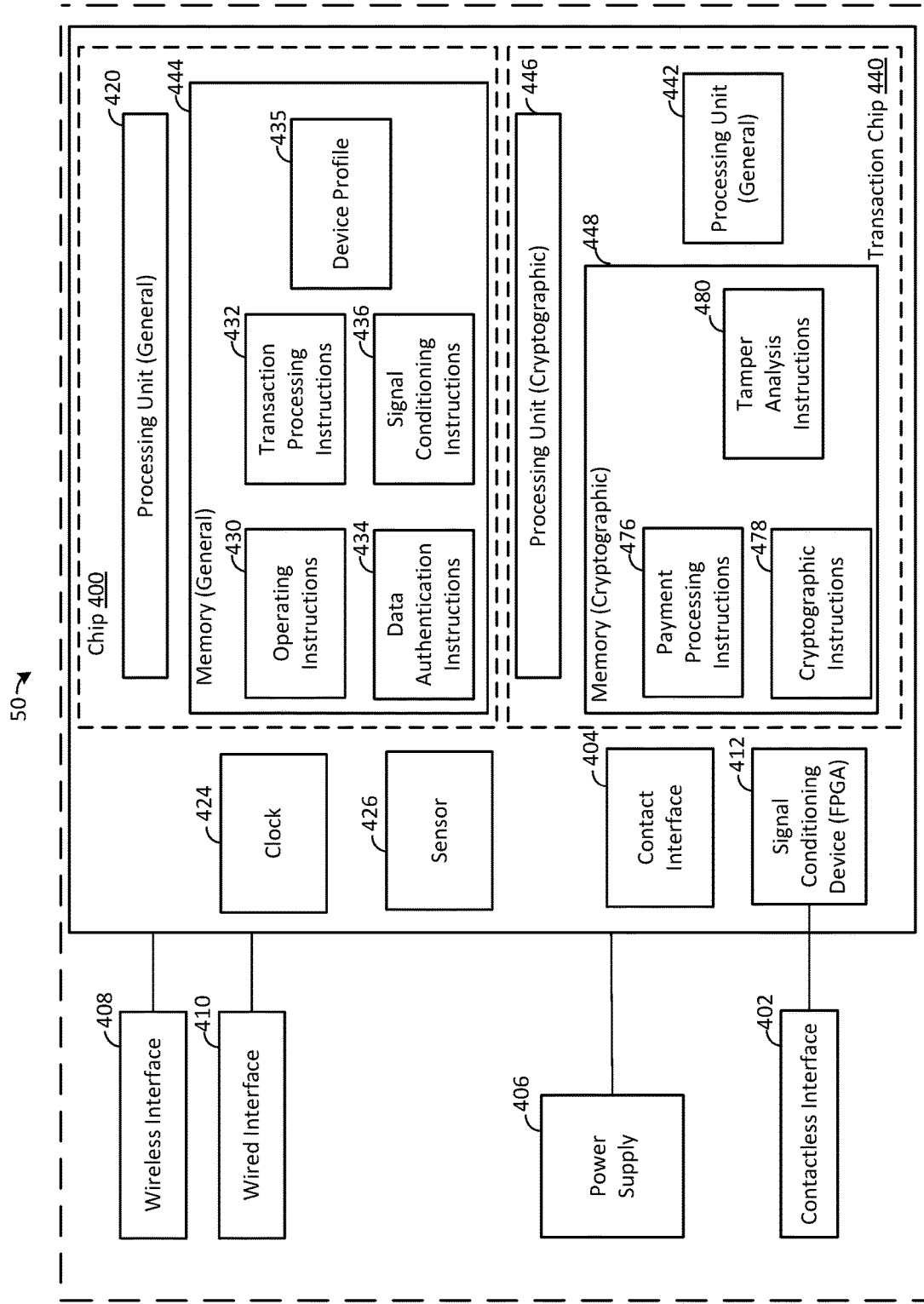
FIG. 4 is a high-level block diagram of the payment terminal in which the tamper detection technique can be implemented in accordance with some embodiments of the present disclosure.

FIG. 4 depicts a block diagram of an exemplary payment terminal 20 in accordance with some embodiments of the present disclosure. In one embodiment, payment terminal 20 can be a server that communicates with other entities over a cloud network. In another embodiment, some components of the payment terminal 50 may be included in the payment terminal 20 may be a wireless communication device that communicates wirelessly with an interactive electronic device such as a POS terminal 20, for example, using BLE. Although particular components are depicted in a particular arrangement in FIG. 4, it will be understood that payment terminal 20 may include additional components, one or more of the components depicted in FIG. 4 may not be included in payment terminal 20, and the components of payment terminal 20 may be rearranged in any suitable manner. In one embodiment, payment terminal 20 includes a terminal chip 400, a plurality of payment interfaces for interfacing with payment reader (not shown), a power supply 406, a wireless communication interface 408, a wired interface 410, a user interface 412, and a transaction chip 440. Chip 400 of payment terminal 20 includes a processing unit 420 and memory 444. Transaction chip 440 of PPS 50 includes a general processing unit 442, cryptographic processing unit 446, general memory 444, and cryptographic memory 448. Although in one embodiment the processing units and memories will be described as packaged in a chip 400 and transaction chip 440 respectively, and configured in a particular manner, it will be understood that processing unit 420, general processing unit 442, cryptographic processing unit 446, memory including general memory 444, and cryptographic memory 448 may be configured in any suitable 444 manner to perform the functionality of the payment terminal 20 as is described herein. It will also be understood that the functionality of chip 400 and transaction chip 440 may be embodied in a single chip or a plurality of chips, each including any suitable combination of processing units and memory to collectively perform the functionalities of chip 400 and transaction chip 440 as described herein.

In some embodiments, processing unit 420 of chip 400 of payment terminal 20 may be any suitable processor and may include any suitable hardware, software, memory, and circuitry as is necessary to perform and control the functions of payment terminal 20. Processing unit 420 may include any suitable number of processors, and may perform the operations of chip 400 based on instructions in any suitable number of memories and memory types. In some embodiments, processing unit 420 may have multiple independent processing units, for example a multi-core processor or other suitable component. Processing unit 420 may execute instructions stored in memory 444 of chip 400 to control the operations and processing of PPS 50. As used herein, a processor or processing unit may include one or more processors having processing capability necessary to perform the processing functions described herein, including but not limited to hardware logic (e.g., hardware designed by software that that describes the configuration of hardware, such as hardware description language (HDL) software), computer readable instructions running on a processor, or any suitable combination thereof. A processor may run software to perform the operations described herein, including software accessed in machine readable form on a tangible non-transitory computer readable storage medium.

As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable, and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Chip 400 may also include additional circuitry such as interface circuitry, analog front end circuitry, security circuitry, and monitoring component circuitry. In one embodiment, interface circuitry may include circuitry for interfacing with a wireless communication interface 108, circuitry for interfacing with a wired interface 110 (e.g., USB, Ethernet, FireWire, and Lightning), circuitry for interfacing with other communication interfaces or buses (e.g., I2C, SPI, UART, and GPIO), and circuitry for interfacing with a power supply 406 (e.g., power management circuitry, power conversion circuitry, rectifiers, and battery charging circuitry).

Transaction chip 440 may include one or more processors having processing capability necessary to perform the processing functions described herein, including but not limited to hardware logic, computer readable instructions running on a processor, or any suitable combination thereof. In an exemplary embodiment, transaction chip 440 may include two RISC processors and may perform functionality relating to processing of payment transactions, interfacing with payment instruments, cryptography, and other payment-specific functionality. In some embodiments, transaction chip 440 may include a general processing unit 442 for executing instructions associated with general payment functionality and a cryptographic processing unit 446 for handling cryptographic processing operations. Each of general processing unit 442 and cryptographic processing unit 446 may have dedicated memory associated therewith (i.e., general memory 444 and cryptographic memory 448). In this manner, specific cryptographic processing and critical security information (e.g., cryptographic keys, passwords, user information, etc.), may be isolated from other circuitry of transaction chip 440 and securely stored and processed by cryptographic processing unit 446 and stored at cryptographic memory 448.

One or both of general processing unit 442 and cryptographic processing unit 446 of transaction chip 440 may communicate with chip 100 (e.g., processing unit 420), for example, using any suitable internal bus and communication technique. In this manner, chip 400 and transaction chip 440 can collectively process transactions and communicate information regarding processed transactions (e.g., with POS terminal 20).

In some embodiments, general processing unit 442 may include any suitable processor for performing the payment processing functionality of payment reader 3 described herein. In some embodiments, general memory 444 may be any suitable memory (e.g., as described herein), and may include a plurality of sets of instructions for performing general transaction processing operations of payment reader 3, such as transaction processing instructions, data authentication instructions, and signal conditioning instructions, any of which may be implemented entirely or partially in firmware stored at memory 444.

Transaction processing instructions may include instructions for controlling any suitable general transaction processing operations of the payment system 5, such as controlling the interaction between the payment terminal 20 and a payment instrument 10 (e.g., for interfacing with a payment instrument 10 via the contactless interface or contact interface), selecting payment processing procedures (e.g., based on a payment processing entity associated with a payment method), interfacing with the cryptographic processor 446, and any other suitable aspects of transaction processing. Data authentication instructions 434 may include instructions for providing configuration information for a payment terminal 20. The configuration information may include any suitable information, such as payment limits and types of transactions for local transactions (i.e., transactions that occur without contacting a payment server 40) and supported applications.

As an example, in some embodiments, data authentication instructions 468 may include configuration instructions such as TMS-CAPK instructions. In some embodiments, the TMS-CAPK may be tailored for a particular jurisdiction (e.g., country-specific). Signal conditioning instructions 436 may include instructions for interacting with a contactless interface and signal conditioning circuitry for the contactless interface, including instructions for conditioning signals received from a payment instrument 10 via the contactless interface 402 (e.g., from a NFC payment instrument 10). Signal conditioning instructions 436 may include instructions for conditioning signals using any suitable hardware, logic, or algorithm required to process NFC signals received via contactless interface 402.

Cryptographic processing unit 446 may be any suitable a processor as described herein, and, in some embodiments, may perform cryptographic functions for the processing of payment transactions. For example, in some embodiments a cryptographic processing unit 446 may encrypt and decrypt data based on one or more encryption keys, in a manner that isolates the encryption functionality from other components of payment reader 3 and protects the encryption keys from being exposed to other components of payment reader 3.

In some embodiments, cryptographic memory 428 may be any suitable memory or combination thereof as described herein, and may include a plurality of sets of instructions for performing cryptographic operations, such as payment processing instructions and cryptographic instructions. Payment processing instructions may include instructions for performing aspects of payment processing, such as providing for encryption techniques to be used in association with particular payment procedures, accessing account and processing information, any other suitable payment processing functionality, or any suitable combination thereof. Cryptographic instructions may include instructions for performing cryptographic operations. Cryptographic processing unit 446 may execute the cryptographic instructions to perform a variety of cryptographic functions, such as to encrypt, decrypt, sign, or verify a signature upon payment and transaction information as part of a payment transaction. In some embodiments, cryptographic memory 448 may be any suitable memory (e.g., as described herein), and may include a plurality of sets of instructions for performing operations of payment reader 3, such as tamper analysis instructions 480, any of which may be implemented entirely or partially in firmware stored at memory 448.

The tamper analysis instructions 480 may include instructions for communicating with the payment terminal 20 and payment server 40 to provide information related to characteristics, such as location, signal strength, power levels, radiation levels, and the like, to the payment terminal 20 and server 40. The tamper analysis instructions 480, in some implementations, can also be received as payload/detection sequences from the terminal 20 or server 40 either randomly or at predefined time intervals. The execution of the tamper analysis instructions 480 causes collection of reader characteristics, including behavioral characteristics such as geographic locations where the merchant carries the reader, the reader that the merchant uses to sell categories of items, the time of day the readers are active, the average amount spent by the buyers in certain merchant categories, the average time the merchant spends in interacting with the reader, and so forth. The configuration information may include any suitable information, such as payment limits and types of transactions for local transactions (i.e., transactions that occur without contacting a payment server 40) and supported applications. The tamper analysis instructions 480 when executed generate a device profile 435 for a reader connected to the terminal or for the terminal itself. The device profile 435 is a tamper profile specific to the device or devices that are similar to the device.

Wireless communication interface 408 may include any suitable wireless communications hardware (e.g., antennas, matching circuitry, etc.) and one or more processors having processing capability necessary to engage in wireless communication (e.g., with a POS terminal 20 via a protocol such as BLE) and control associated circuitry, including but not limited to hardware logic, computer readable instructions running on a processor, or any suitable combination thereof. Although in one embodiment, the processing unit 442 and memory 432 will be described as packaged in a wireless communication interface 408 and configured in a particular manner, it will be understood that processing unit 230 and memory 432 may be configured in any suitable manner to perform the functionality of the wireless communication interface 408 as is described herein.

Processing unit 442 may include any suitable processor or processing hardware for performing the functionality of wireless interface 408 as described herein. In some embodiment, processing unit 430 may execute the instructions of memory 432 to interact with and control hardware and other components of the wireless communication interface 408 in order to transmit and receive wireless communications (e.g., via BLE) and to communicate with other circuitry (e.g., processing unit 220 of chip 400) of payment reader 3 (e.g., using an internal bus or any other suitable communication method). Memory 432 is memory, as described herein, and may include wireless instructions for performing the processing operations of wireless communication interface 408. In some embodiments, memory 432 may be implemented as static random-access memory (SRAM), but any suitable memory format may be used to carry out the functionality of payment reader 3 as described herein. Wireless instructions 432 may include instructions for interacting with processing unit 420 of chip 400, in order to perform functions such as sending and receiving messages, configuring aspects of a BLE connection, and controlling bonding and pairing of wireless communication interface 408 to other devices (e.g., to POS terminal 20 using BLE).

Contactless interface 402 may provide for NFC communication with a contactless device such as NFC device or chip card. Based on a signal provided by chip 400, an antenna of contactless interface 402 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 23092. When the payment reader 3 is inductively coupled to a contactless device, the contactless device may also modulate the carrier signal, which may be sensed by the contactless interface 402 and provided to the chip 400 for processing. Based on these modulations of the carrier signal, payment reader 3 and a contactless device are able to communicate information such as payment information.

Contact interface 404 may be a suitable interface for providing power to a payment chip such as an EMV chip of a chip card and communicating with the EMV chip. Contact interface 404 may include a plurality of contact pins (not depicted in FIG. 3) for physically interfacing with the chip card according to EMV specifications. In some embodiments, contact interface 408 or 410 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

Power supply 406 may include one or more power supplies such as a physical connection to AC power or a battery. Power supply 406 may include power conversion circuitry for converting AC power and generating a plurality of DC voltages for use by components of payment reader 3. When power supply 406 includes a battery, the battery may be charged via a physical power connection, via inductive charging, or via any other suitable method. Although not depicted as physically connected to the other components of the payment reader 3 in FIG. 3, power supply 406 may supply a variety of voltages to the components of the payment reader 3 in accordance with the requirements of those components.

Wired interface 410 may include any suitable interface for wired communication with other devices or a communication network, such as USB, Lightning, FireWire, Ethernet, any other suitable wired communication interface, or any combination thereof. In some embodiments, wired interface 410 may allow payment reader to communicate with one or both of POS terminal 20 and payment server 40.

User interface 412 may include any suitable user interface (e.g., buttons, touchscreen, keyboard, voice recognition, biometric readers, etc.) that allow a user to directly interact with a payment reader 3. In some embodiments, many of the user interface interactions with a payment reader 3 may be accomplished by a point-of-sale application running on a POS terminal 20, and may be communicated via either wireless interface 408 or wired interface 410. User interface 412 may be a simple interface, such as a single button or limited set of buttons. Different types or sequences of button presses (e.g., holding a button down for more than a threshold time, particular sequences of button presses, etc.) may implement different functionality at the payment reader 3.

Memory 444 of chip 400 may include a plurality of sets of instructions for controlling operations of payment reader 3, such as operating instructions 430, transaction processing instructions 432, data authentication instructions 434 and signal conditioning instructions 436.

Operating instructions 424 may include instructions for controlling any suitable general operations of the payment reader 3, such as internal communications, power management, processing of messages, system monitoring, sleep modes, user interface response and control, operation of the wireless interface 408, operation of the transaction chip 440, and the management of the other sets of instructions. In one embodiment, the operating instructions 430 may provide the operating system and applications necessary to perform most of the processing operations that are performed by the processing unit 420 of payment reader 3.

Operating instructions 230 may also include instructions for interacting with a POS terminal 20. In one embodiment, the POS terminal 20 may be running a point-of-sale application. The operating instructions 430 may include instructions for a complementary application to run on processing unit 420 of chip 400, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 3 (e.g., via wireless interface 408). The operating instructions 430 facilitate processing of the payment, for example, by acquiring payment information via the contactless interface 402 or contact interface 404, invoking the transaction chip 440 to process that payment information, and by generating responsive messages that are transmitted to the point-of-sale application of the POS terminal via wireless interface 408.

Operating instructions 430 may also include instructions for interacting with a payment server 40. In one embodiment, a payment server 40 may be associated with the payment reader 3 and the point-of-sale application of the POS terminal 20. For example, the payment server 40 may have information about payment readers 3 and POS terminals 20 that are registered with the payment server 40 (e.g., based on unique identifiers). This information may be used to process transactions with servers of the merchant and customer financial institutions, for providing analysis and reports to a merchant, and aggregating transaction data. The payment reader 3 may process payment information (e.g., based on operation of chip 400 and transaction chip 140) and communicate that processed payment information to the point-of-sale application, which in turn communicates with the payment server 40. In this manner, messages from the payment reader 3 may be forwarded to the payment server 40, such that the payment reader 3 and payment server 40 may collectively process the payment transaction.

Transaction processing instructions 432 may include instructions for processing payment transactions at payment reader 3. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 220, these instructions may determine whether to process a transaction locally, how payment information is accessed from a payment instrument, how that payment information is processed, which cryptographic functions to perform, the types of communications to exchange with a payment server, and any other suitable information related to the processing of payment transactions. In some embodiments, transaction processing instructions 432 may perform high level processing, and provide instructions for processing unit 220 to communicate with transaction chip to perform most transaction processing operations.

Wireless instructions 428 may include instructions for configuring a wireless interface, managing wireless pairing/bonding, optimizing throughput of the wireless connection, engaging in wireless communications, and controlling any other suitable functionality relating to the operation of a wireless interface of the payment reader (e.g., wireless interface 408). Although wireless instructions may operate in conjunction with any suitable wireless interface 408, in an exemplary embodiment the wireless interface 408 may be a BLE interface.

In some embodiments, wireless instructions 428 may include instructions for configuring wireless interface 408. In some embodiments, processing unit 220 of chip 400 may execute wireless instructions 428 to exchange messages in order to communicate with wireless interface 408 to configure the wireless interface 408 for operation. Any suitable parameters may be configured based on the wireless instructions, such as settings related to pairing/bonding (e.g., General Access Profile (GAP) settings, advertising modes, discovery modes, available roles, and white lists) and connections (e.g., General Attribute Protocol (GATT) settings, connection intervals, and maximum transmission units).

In some embodiments, wireless instructions 436 may include instructions for managing wireless pairing/bonding between wireless interface 408 and a wireless interface of the POS terminal 20. In some embodiments, wireless instructions may enforce a structured procedure for establishing, maintaining, and modifying connections between payment reader 3 and POS terminal 20. Although any suitable structured procedure may be implemented by wireless instructions 428, in some embodiments an exclusive connection may be established between payment reader 3 and a single POS terminal 20. Procedures may also be established for payment reader 3 to enter states where it may advertise for possible exclusive bonds with other POS terminals 20, for example, based on a user input.

In some embodiments, wireless instructions 436 may include optimizing throughput of a wireless connection between the wireless interface 408 of the payment reader 3 and a wireless interface of the POS terminal 20. In some embodiments, payment reader 3 may modify certain parameters of a particular BLE connection with a POS terminal 20 in order to optimize the connection (e.g., for a desired throughput, etc.). The payment reader 3 may set the parameters itself, and in some embodiments, may communicate with POS terminal 20 to receive a request to modify the parameters. For example, in some embodiments, the processing unit 420 of chip 400 of payment reader 3 may have low-level access to commands that are exchanged with wireless interface 108, such that payment reader 3 may modify numerous parameters that cannot be modified by a point-of-sale application running on a POS terminal 20, which may only be able to modify a limited subset of parameters or provide high-level commands (e.g., through a required API for the BLE interface of the POS terminal 20). In an embodiment, if a point-of-sale application operating on a POS terminal 20 desires to monitor or modify lower-level parameters of the BLE connection (e.g., maximum transmission units and connection intervals) it may communicate with the payment reader 3 to acquire the desired information or modify the lower level parameter.

In some embodiments, wireless instructions 436 may include instructions for engaging in wireless communications between a processing unit of payment reader 3 (e.g., processing unit 420) and processing of the POS terminal 20, via the wireless interface 408 of the payment reader 3 and a wireless interface of the POS terminal 20. During an active BLE connection, data packets may be exchanged via one or more BLE characteristics, with data packets able to be sent in modes such as an acknowledged and unacknowledged mode. In an unacknowledged mode, additional packets may be transmitted immediately after the unacknowledged message was sent (i.e., an unreliable message). In an acknowledged mode, additional packets may not be sent until the acknowledgement packet has been acknowledged by the other BLE device (a reliable connection), which occurs during a later connection event between the two devices. In some embodiments, processing unit 420 of chip 400 may execute wireless instructions 428 in order to selectively control the selection of acknowledgement packets and unacknowledged packets, for example, based on the type of information being transmitted. The data authentication instructions 434 include instructions to generate, provide or otherwise modify the reader profile associated with the reader 3. The reader profile varies as the reader moves from a first location to a second location. The reader profile can be modified either by a POS terminal 20 or by itself. The reader 3 also includes sensor 426 such as a magnetometer, an accelerometer, transmitter/receiver of an antenna subsystem, camera, a GPS unit, a spectrum analyzer, a gyrometer, and the like. The sensor may be based upon any later-developed or convention sensor technology, such as CMOS, CCD, or the like. Image recognition components may be provided to process the image data. For example, such components can support functionalities including, but not limited to, location tracking, location detection, device fingerprinting, barcode detection, facial recognition, camera parameter control, etc.

Figure 5:
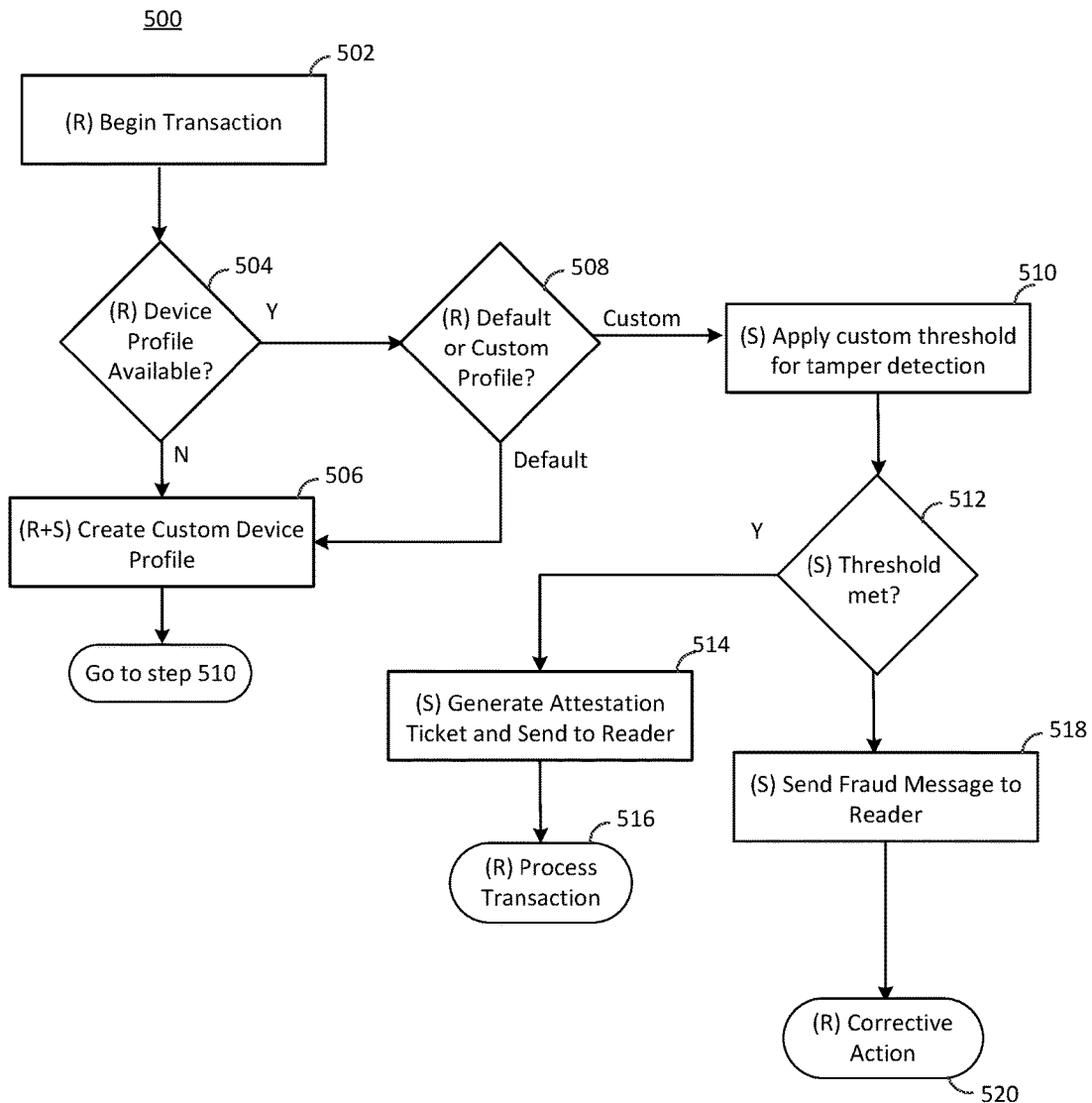
FIG. 5 is a method for performing physical and logical detection of fraudulent transactions and tamper attempts in accordance with some embodiments of the present disclosure.

FIG. 5 depicts steps 500 for performing physical and logical detection of fraudulent transactions and tamper attempts in accordance with some embodiments of the present disclosure. In one embodiment, as is depicted in FIG. 5, steps 500 are performed by a payment terminal device such as a payment reader 3 (indicated with an (R) in FIG. 5) and a payment processing system 50 of a payment server 40 (indicated with a (S) in FIG. 5). Although these steps are described as being performed by particular devices in one embodiment, it will be understood that the allocation of the steps between the devices may be modified in any suitable manner or that the number of devices performing the steps may be modified in any suitable manner.

At step 502, processing unit 220 of payment reader 3 may begin a payment transaction with a payment device 10, such as an NFC device or an EMV chip. In some embodiments, the remaining steps of FIG. 5 may be performed even when a transaction has not been initiated. In this manner, it may be possible to check for tamper attempts even when transactions are not being processed. Once a payment transaction has been initiated at step 502, processing may continue to step 504.

At step 504, processing unit 220 of payment reader 3 may determine whether a device profile 252 is associated with the reader 3. The device profile 252 is used to monitor physical signals as per tamper monitoring instructions 250. For example, the device profile may also dictate which traces to enable for monitoring or which ports to enable to collect environmental data and when to send signals for such monitoring or detection. In some embodiments, signals may be provided to one or more monitoring components, such as a test waveform. Although these monitored physical signals may be used to determine any suitable information, in some embodiments electrical characteristics, detection signals, and monitored timing may be determined based on the monitored physical signals. Processing may then continue to step 506 if a device profile already exists. However, if a device profile is not associated with the device, for example in cases where the reader 3 is a new reader and not registered with the server 40, a new profile may be generated unique to the reader as explained in step 508. In some implementations, the new reader may be associated with a default profile that does not have characteristics unique to the reader but can be modified to customize to the reader 3.

Figure 6A:
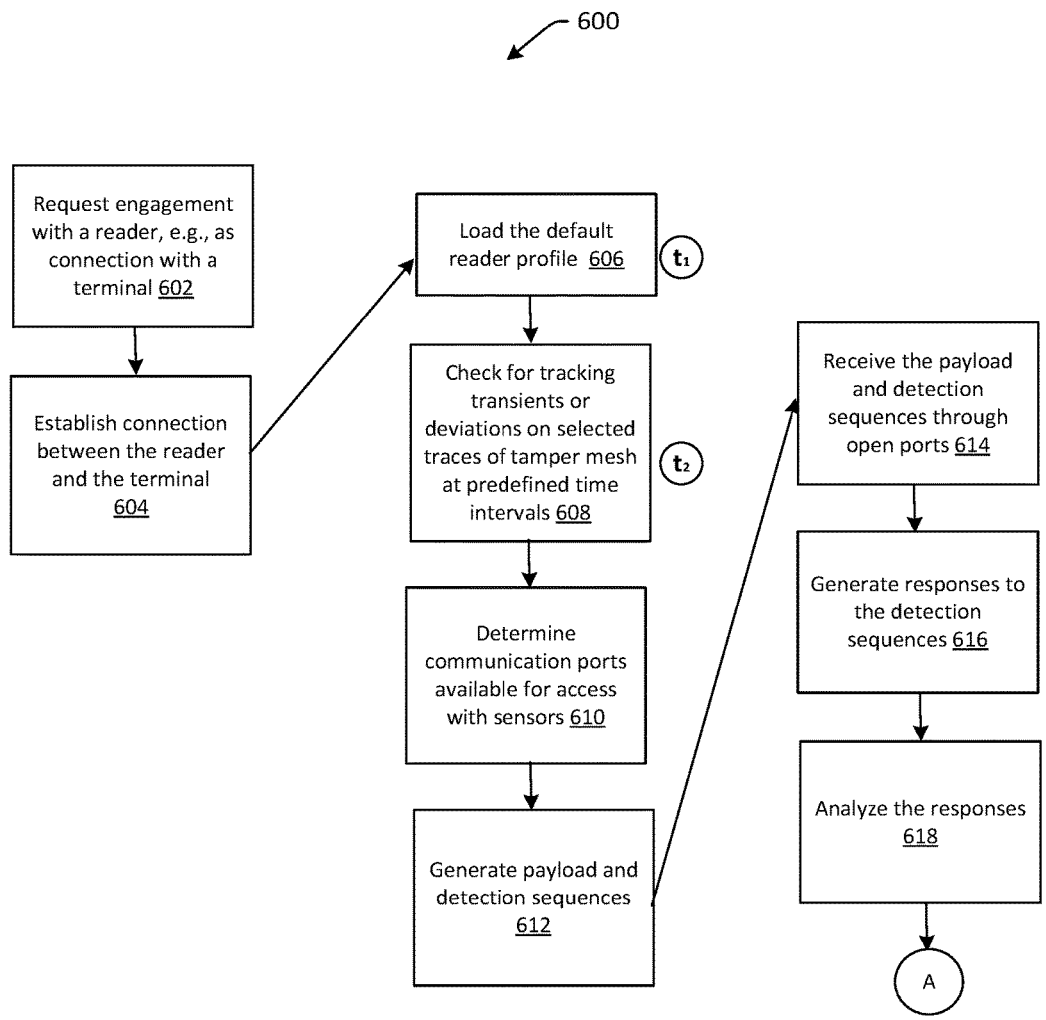
FIGS. 6A and 6B is a method to generate a profile specific to the card reader, in accordance with some embodiments of the present disclosure.
Figure 6B:
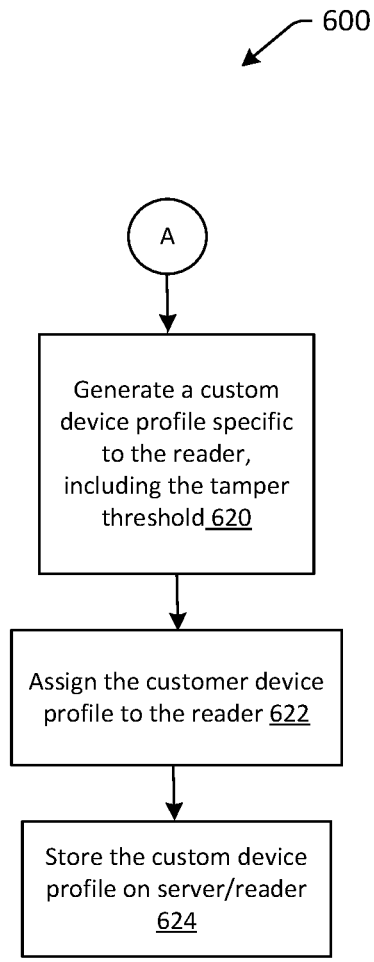

At step 506, processing unit 220 of payment reader 3 may perform active testing of components within or associated with the reader 3, collect data from environment surrounding the reader 3, and enable certain traces of the tamper mesh associated with the tamper monitoring component based on the fraud/tamper instructions to create a custom device profile in accordance with test criteria explained in detail in FIGS. 6A and 6B. Although any suitable active testing may be performed in accordance with the present disclosure, in some embodiments active testing may include providing signals and messages, such as request messages (e.g., random number test requests, error condition test requests, and message timing test requests). Based on the responses received from the payment device, and in some embodiments other signals (e.g., electrical characteristics and timing information), information such as monitored responses and monitored timing may be obtained. Processing may then continue to step 510.

At step 508, once it is determined that a profile is associated with the reader, the processing unit 220 of payment reader 3 may further determine if the profile is custom or default. For example, if the reader is a new reader and not yet registered with the payment service 40, it may either not have a profile or it may come pre-configured with a default profile, for example a profile that is generic to all readers. Such indication can be made through a flag value stored along with the device profile 252. However, in some implementations the profile may be a device profile that is customized to the reader based on various factors, such as the local environment in which it operates, the business to which the reader caters, the location where it operates, or the merchant/business characteristics and the like. Thus, if the flag indicator is 1, the device profile 252 can be a custom device profile and if the flag indicator is 0, the device profile 252 is a default device profile. The flag indicator can be triggered from 0 to 1 at the time the custom profile is created.

If the profile is a default profile, then at step 508, the method flow may request the reader to create a custom profile so that false tamper positives can be avoided. However, in certain cases, the merchant may want to proceed with the default profile.

If, however, the profile is a custom profile, then at step 510 a custom threshold is applied in which it is determined from the analysis at step 508 whether a fraudulent transaction or tamper attempt has been detected as per custom threshold or conditions defined by the custom device profile, such that the payment reader 3 should take corrective action immediately, in which case processing may continue to step 520. In some embodiments as depicted in FIG. 5, if the local test criteria as defined by the custom device profile do not indicate that corrective action should be taken immediately, processing may continue to step 514. However, it will be understood that in some embodiments (not depicted in FIG. 5), processing may only continue to step 518 if the local test criteria indicate that a suspicious transaction (e.g., that does not require immediate corrective action) has occurred.

Along with the profile, processing unit 220 of payment reader 3 may also send information to a server based on the fraud/tamper instructions 240 for tamper detection. Although any suitable information may be sent to any suitable server, in some embodiments payment reader 3 may send a server request message to a payment processing system 50 of a payment server 40 via merchant device 20 and network 30. Although it will be understood that any suitable information may be provided in the server request message, in some embodiments the information may include monitored electrical characteristics, monitored timing, monitored responses, transaction information, information about the payment terminal (e.g., location, etc.), environmental information (e.g., temperature, etc.), statistics determined therefrom, and preliminary assessments based on local test criteria. Processing may then continue to step 514.

The processing unit of payment processing system 50 may receive the information (e.g., the server request message) via communication interface 410 based on operating instructions 430 and tamper/fraud analysis instructions 480. The received information (e.g., monitored electrical characteristics, monitored timing, monitored responses, transaction information, information about the payment terminal (e.g., location, etc.), environmental information (e.g., temperature, etc.), statistics determined therefrom, and preliminary assessments based on local test criteria) may be extracted from the server request message for processing by the payment processing system 50. Processing may then continue to step 516.

At step 512, the server applies the tamper threshold to the data received and if the threshold is met, the process flows to step 518 otherwise the flow transitions to step 514.

At step 514, the server generates an attestation ticket with or without conditions to indicate validity, times, or location where the reader can be used securely and the process terminates at step 516.

At step 516, processing unit of payment processing system 50 may analyze the received information based on the tamper/fraud instructions 480. In some embodiments, the received information may be analyzed using server test criteria and based on other sources of information, such as previously stored information from the same payment terminal 20 (e.g., payment reader 3 of payment terminal 20), from the same payment device 10, from other payment terminals, and from other payment devices. The received information may also be analyzed based on other transactions that are happening concurrently. The received information may also be stored, such as in transaction database. Processing may then continue to step 518.

At step 518, processing unit of payment processing system 50 may determine whether a fraudulent transaction or tamper attempt has been detected based on the tamper/fraud analysis instructions 480 stored either at the reader or server. As described herein, in some embodiments the received information may be analyzed based on the server test criteria, information stored in the transaction database, and concurrent payment transactions. If it is determined that a fraudulent transaction or tamper attempt has occurred, processing may continue to step 518. If it is determined that a fraudulent transaction or tamper attempt has not occurred, processing may continue to step 514.

At step 516, processing unit 442 of payment processing system 50 may send a message to the payment terminal 10 indicating that the transaction should be processed, based on the operating instructions 420, the payment processing instructions 476, and tamper/fraud analysis instructions 480. In some embodiments, payment processing system may communicate with one or more servers such as a bank server 60, process the transaction, generate an approval message indicating that the transaction has been approved and including information regarding the processed transaction, and transmit the message to payment reader 3 via network 30 and merchant device 20. The processing unit 220 of payment reader 3 may process the transaction based on the approval message and the transaction processing instructions 232. Once the transaction has been processed, the processing of steps 500 may end.

At step 518, processing unit 302 of payment processing system 50 may generate and send a message such as a fraud determination message to a payment terminal 20 (e.g., payment reader 3) based on the operating instructions 420 and the tamper/fraud analysis instructions 480. In some embodiments, the fraud determination message may include information such as an indication that a fraudulent transaction or tamper attempt is occurring, information about the type of fraudulent transaction or tamper attempt, and instructions regarding a type of corrective action to perform. Processing may then continue to step 526.

At step 520, processing unit 220 of payment reader 3 may take corrective action based on the fraud/tamper instructions 240. As described herein, the processing of step 526 may occur based on a determination at either the payment reader 3 (e.g., based on local test criteria) or the payment processing system 50 (e.g., based on server test criteria, concurrent transactions, and data stored in transaction database). The payment reader may then take appropriate corrective action (e.g., aborting a transaction, temporarily or permanently removing power, or disabling one or more components of the payment terminal, querying the payment device to gather additional information, or employing countermeasures), as described herein. The processing of steps 500 may then end.

FIGS. 6A and 6B are sequence flows illustrating an example process 400 of a method of registering a reader in order to create a device profile with a payment processing system, according to an embodiment of the present subject matter.

The process 600 can be performed by one or more components, devices, or components such as, but not limited to, the mobile device, the payment processing system, merchant device or POS terminal, the payment reader, or payment beacon or other components or devices. For the sake of explanation, the description hereinafter is described with reference to components described in FIGS. 1-4. It will be understood that the method can be carried out by any component of the payment system, e.g., the payment reader 3, the POS terminal, PPS or both, for example contemporaneous to the payment reader. The process 600 can be applied to determine custom profile as indicated in step 506 of FIG. 5, in one implementation.

The process 600 starts with the operation at block 602. A merchant having a reader presents a reader for connection. The merchant accesses a merchant application to initiate registration. The merchant establishes connection between the reader and the terminal, for example a Bluetooth connection at step 604. As part of the connection, the relationship between the merchant, the payment application, financial account, and reader information is stored either locally on a merchant terminal 20 or on a server 40. This information is then looked up if another reader attempts to connect with the merchant application or terminal. The reader profile, if a default profile, is available is loaded at step 606. This step may be performed when the merchant attempts to register a reader and associate with an account, for example at time t1.

At time t2, or contemporaneous to the above step, the payment terminal, as part of routine or in response to a trigger condition such as detection of a new device in the near field range, scans the environment to collect state of readers in proximity to the reader, to generate a custom device profile (step 608). The custom device profile may also store the location coordinates of the reader and other device and behavioral characteristics. It will be understood that at the time of registration, the behavior of a reader may not be known. Such data is constantly and periodically updated as the behavior of a reader is learned. Behavioral characteristics include locations where the reader moves, the items purchased through the reader, the time when the reader is active, the behavior of other readers in proximity to the reader or otherwise relevant to the reader (same merchant code, same location, etc.) and so on.

To collect reader profile, both for the reader at the time of registration and in response to a trigger condition, the following steps may be performed. The entry of a new device, such as an unknown reader, may be detected through location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the present subject matter enables automatic geo-fence establishment and activation. According to the present subject matter, the geo-fence is defined and established based on a current location of an asset, for example using GPS data comprising latitude and longitude along with some predetermined area based on range or distance. In this manner, the user need not manually specify a location by drawing a perimeter, specifying a point location, or by any other means. For behavioral analysis and tamper detection, the device enables specific traces for each of the purposes and also sets timing parameters of when to detect for tampering and when to obtain data for determining behavior of the reader. Accordingly, the reader enables or disables certain tamper traces in a mesh protecting the reader.

This step of detecting location of the devices with respect to the location of the POS terminal may be performed contemporaneous to the step of selecting traces for the tamper profile. Additionally, the terminal can use location of other readers in the neighborhood to determine which traces are more susceptible to tampering and should therefore be either disabled or used for device profile (step 608). This step is further explained with reference to FIG. 7. The transients detects by the traces, for example due to changing temperature, pressure, humidity, etc., are obtained at step 608. Such data can be obtained either at all times or at predefined time intervals.

The server centrally or reader locally determines how it can interact with the sensors for collecting data on the environment, such as pressure, humidity, etc. The reader establishes communication channels with specific sensors of the reader or readers similar to the reader in question (either in terms of location or merchant category). For this, the reader sends preliminary signals or data to explore communication ports in the reader, which are available for communication (step 610). Accordingly, the reader generates payload and/or detection sequences adapted based on the available communication ports and in accordance with the communication protocols on which the ports operate (step 612). The detection sequences can be in the form of specific signals requesting the device to respond in a certain way. The detection sequences can also be information-gathering requests configured to obtain device fingerprints. Device fingerprints include radio, location, mechanical or operational fingerprints—such as radiated performance, device defects, sensor performance, communication speed or lags, spectrum data, behavior, movement history and the like.

The sensors or other components within the reader receives the payload and detection sequences via the appropriate communication ports and protocols (step 614) and responds accordingly. For example, the detection sequences can be queries to which the device responds with a yes or a no. In another example, the detection sequences dictates how the payload can be sent to a particular component of the device, such as the sensors, to evaluate its performance. The detection sequences also include instructions to send the information back to the requestor, in this case the terminal. In some cases, the responses may be encoded at the device level by appending randomly generated tokens to generate a new reader profile.

The reader can also apply tokenized pseudo-random numbers (also referred to as hash keys) to the feature vectors to generate the device fingerprint. A National Institute of Standard and Technology (NIST) compliant True Random Number Generator (TRNG) can generate the pseudo-random numbers. The encoding can also be done based on keys generated by a cryptographic unit (not shown). Examples of keys include authentication keys, which include SCP03 master keys (Message Authentication Code Key: MAC, Encryption Key: ENC and Key Encryption Key: KEK, which are 256-bit Advanced Encryption Standard (AES) symmetric keys with associated key derivation data) or Key Agreement Keys (e.g., user server signature verification public key, user server static public key, user static key pair with both public and private key). The encrypted fingerprint can also be created using other schemes, such as fuzzy vault algorithm, a cancelable fuzzy vault scheme based on irreversible hash functions, such as hash functions, such as MD, RIPEMD, and SHA. (Step 616.)

The sensor values and transients/deviations detected by the traces, which are to be used for creation of a device profile, can be sent to the server, and analyzed at step 618. The analysis involves decryption of the responses and generation of behavior or trends based on the responses. For example, the analysis involves comparison of the new behavior with an existing reader profile to see if there are any deviations. A threshold or confidence score is also set to compare the deviation with.

In one embodiment, the data from the traces and the sensors is sent to a server for creation of a tamper profile customized to the reader based on the environmental data obtained from the surroundings. In another embodiment, the default profile that the reader came with is adjusted based on the created device profile. The device profile may include tamper threshold that indicates the threshold value and conditions that trigger tampering.

While the description hereinafter discusses readers and their profile as a tool for detection of a fraudulent behavior, it will be understood that any other device or instrument that uniquely identifies a behavioral change can be used. Further, the device fingerprinting as described herein can be used for card authentication, targeted advertising, delivering rewards and coupons, establishing pre-orders, facilitating delivery of orders, and the like. Owing to the unique and personalized nature of reader behaviors with respect to the payment terminal, payment transactions are less vulnerable to frauds and false positives. Further, the fraud detection technique leveraging the registered reader profile is friction-less, quicker, easier, more efficient, and more convenient especially when compared to traditional methods of payment that require manual checks. Further, according to the present subject matter, it is possible the methods and systems to customize profile by confirming behavior of not just one, but a cluster of readers and other devices in proximity to the POS terminal. So, the payment reader is profiled based on all other readers in proximity to the reader that may have reported false positives, further confirming that the systemic problem of false positives may be due to the environment in which the readers are operating.

Figure 7:
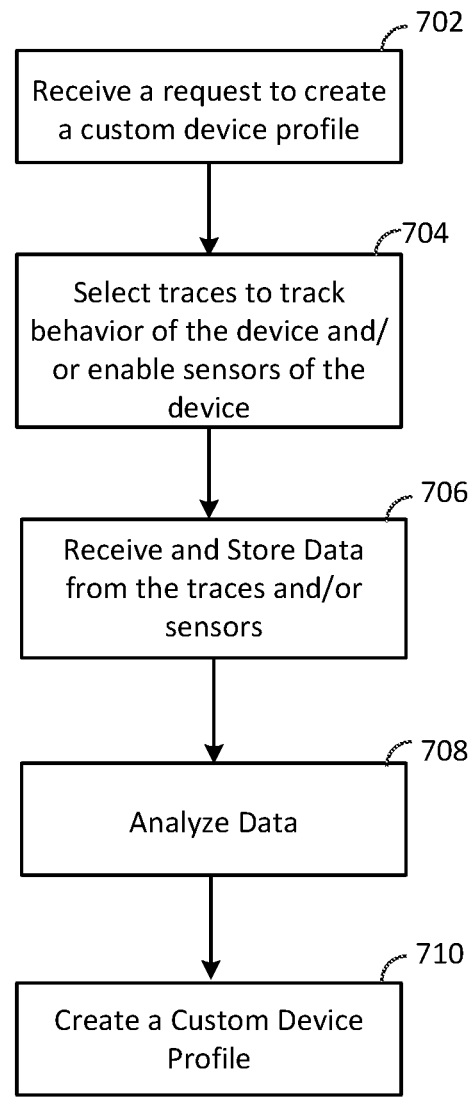
FIG. 7 is a method to apply the card reader's profile in response to an event in accordance with some embodiments of the present disclosure.

FIG. 7 depicts a method 700 for creating a device profile specific to the reader in a field, which is a new reader and just connected to a terminal or an existing reader that was previously disconnected and no reconnected to the same reader, or an existing reader that was previously connected to a terminal but now wishes to connect to a different terminal, in accordance with an embodiment of the present subject matter. The steps can be performed either at a server level or locally by each reader or in a distributed manner. The method begins at step 702, the reader generates a request to create a custom profile. The generated request may either be in the form of a signal that is sent to a server to a tamper analysis component 80 or a local tamper monitoring component 70. In some cases, the reader may already be associated with a device profile, in which case, the reader either updates the profile as per data obtained from the new surroundings or uses the same profile if the validity criteria is met. For example, the profile may indicate that the reader need not update profile for the next month irrespective of any other condition.

At step 704, the tamper monitoring component 70 selects traces to track behavior of the device over time. In another implementation, the tamper analysis component 80 sends instructions to provide state data.

To select traces, the tamper monitoring component 70

Additionally, or alternatively, the tamper monitoring component 70 enables one or more sensors of the device to provide state of the device at that time or report state and trend of device characteristics, such as device location, temperature sensed by the device, pressure experienced by the device, levels of humidity around the reader, manufacturing or engineering tolerances, timing parameters, associated behaviors, etc., over a period of time. In some cases, the tamper monitoring component 704 can interact, through associated sensors, with third party devices to obtain such environmental data. The third-party devices can also include other readers in proximity to the reader or the readers that are physically and logically similar to the reader that is being profiled. In one implementation, the reader 3 extracts or reads specific characteristics, e.g. physical, radio, magnetic, wireless, and the like, from the reader 3. The sensors include, for example, power meter, spectrum analyzer, antenna, transmitter-receiver, microphone, accelerometer, gyrometer, and magnetometer, The tamper monitoring component 70 can request data from other readers or devices in its geofence configured using location detection techniques, such as techniques based on angulation, lateration, proximity detection, dead reckoning, geo-fence, global or local positioning systems, Bluetooth Technology, Near-Field Communication Technology, sensors-based technology, Radio frequency identification (RFID) system, or the like. In one embodiment, the present subject matter enables automatic geo-fence establishment and activation. According to the present subject matter, the geo-fence is defined and established based on a current location of the reader, for example using GPS data comprising latitude and longitude along with some predetermined area based on range or distance. In this manner, the user need not manually specify a location by drawing a perimeter, specifying a point location, or by any other means.

For example, the tamper monitoring component 70 obtains radio fingerprints of the reader 3 by allowing its radio frequency transmitter and receiver to interact with the respective antenna transmitter and receiver of the devices 108, for example on a specific or selected frequency bands. It is assumed that the devices 108 are operating over a wide range of radio frequencies and output power levels. The cellular telephone devices, which are now common, for example, operate in the 800-900 MHz or 1700-1900 MHz range and at power levels of about 600 mW while blue tooth devices operate in the 2.4 GHz range at significantly lower power levels. The tamper monitoring component 70 may send signals to the readers on the frequency and at the power levels understood by reader, where the responses to the signals from the devices 108 help identify the reader to a reasonable accuracy. The signals are within Specific Absorption Rate (SAR) limitations. In some implementations, the tamper monitoring component 70 obtains radio fingerprints in the form of transmission and reception measurements of the reader 3. The transceiver of the payment object reader 110 may obtain transmission measurements for example, among other things a measurement of the phase error, of the frequency error, of the power and of the spectrum, RSSI, RSSI vs. frequency measurements. In reception measurements, bit error rates may be measured. In one implementation, the tamper monitoring component 70 may include additional components, e.g., antenna elements, diplexers, antenna coupler, and the like, to facilitate or obtain more accurate measurements. In another example, the radio fingerprints correspond to radiated performance characteristics, such as Effective Isotropic Radiated Power ("EIRP"), receiver sensitivity, Total Radiated Power ("TRP"), Total Isotropic Sensitivity ("TIS"), and envelope correlation, which is related to receiver diversity performance. These characteristics are also unique to a device given their design differences, given that all other signal propagation factors, such as propagation paths, physical environment, and the like remaining same. This is because in a wireless communication system, an RF modulated signal from a transmitter may reach a receiver via a number of propagation paths. The characteristics of the propagation paths typically vary over time due to a number of factors such as fading and multipath. Further, structures such as buildings, and surrounding terrain, including walls, contribute to the scattering and reflection of the transmitted signal. The scattering and reflection of the transmit signal results in multiple signal paths from the transmitter to the receiver. The contributors to the multiple signal paths change as the receiver moves. Other signal sources also contribute to the degradation of the desired signal. The other signal sources may be other transmitters intentionally operating on the same frequency as the desired signal, as well as transmitters that generate spurious signals in the frequency band of the desired signal. Yet another source of signal degradation may be generated within the receiver itself. Signal amplifiers and signal processing stages within the receiver may degrade the level of the desired signal with respect to the level of thermal noise. The signal amplifiers and processors within the receiver may also generate noise products or distort the received signal and further degrade its quality. The calculated value of the radiated performance characteristics, based on measurements described herein, may then be stored for future detection of the wireless device. At a future time, the radiated performance characteristics are compared to the stored values, in order to determine a radiated performance approval and/or certification of the wireless device. Besides or in addition to radio fingerprints mentioned above, the reader 3 obtains fingerprints of the readers through the wireless transmitter and receiver and over Wi-Fi or Bluetooth communication protocols. In one implementation, the transmitter obtains the fingerprints from the readers 3 by transmitting and receiving command and control parameters to and from the readers 3. The command and control parameters place the wireless device in a detect mode and determine the quality and operations of a radio frequency (RF) link established between the wireless device and the base station. The wireless data communications link is also used to transmit command and control parameters from the wireless device to the base station. The quality of the RF link is stored in a database as wireless fingerprint of the device. At a future instance, the reader's characteristics can be re-establishing an RF link and determining the quality to be similar to one of the stored values, where each value corresponds to a unique device. In some implementations, the uplink and/or downlink data speed through the RF link may be used as parameters to detect a reader 3 from amongst other devices.

In another implementation, the tamper monitoring component 70 measures the manufacturing or engineering tolerances of the sub-components embedded in the readers. For example, the tamper monitoring component 70 can measure the performance of microphone, accelerometer, or other such sensors. In another example, the tamper monitoring component 70 can also be used to measure the defects or anomalies in a particular device that are unique to the device.

In another implementation, the tamper monitoring component 70 is configured to detect any open communication ports in the neighboring device and generate, on-the-fly for example, schemes to communicate detection sequences to the neighboring devices. The schemes are configured based on a communication protocol corresponding to the open port.

Other examples of device characteristics include but are not limited to: timing parameters, radiated performance, wireless performance, quality of communication links, radio frequency response, transmission measurements, receiver measurements, rise-time signatures, spectral values, signal transients, hardware impairments, channel characteristics, power values, signal strength, identity of the received signals, say in terms of frequency or phase, timing parameters associated with the received signal, and engineering tolerances.

At step 706, the tamper monitoring component 70 receives, collates, and enhances data obtained from the traces and sensors either locally or in a remote server. The tamper monitoring component 70 can collate the data from the specific reader and other readers to see if there are any trends or pattern across readers in a certain geo-fence.

At step 708, the tamper monitoring component 70 analyzes the collated data. The collated data from the previous step is used to determine trends in the collated data.

At step 710, the tamper monitoring component 70 creates a custom profile based on the data. The custom device profile defines the boundaries of tamper detection. The tamper threshold can be adjusted based dynamically based on past or current tamper events. In one implementation, a two-tier tamper system can also be configured such that the reader or server does not change any lethal-tamper specification limits, but rather, reports this non-lethal tamper event back to the server for future. In this model, a risk model, for example implemented by the cryptographic instructions 478, can be executed. The server 40 obtains information on the merchant (size, seller reputability, location, business type, etc.) to make an educated decision on a likelihood of a malicious tamper event. Optionally, the tamper threshold can be determined based on the location and environmental factors, including risk level of the merchant or transaction. In some implementations, besides or in addition to varying the tamper threshold, the server can notify the merchant to investigate or replace their reader.

In this model, the server may also apply our existing data on merchants to help assess the tamper state of a reader, without needing to loosen or tighten the existing lethal tamper system on the device.

Figure 8:
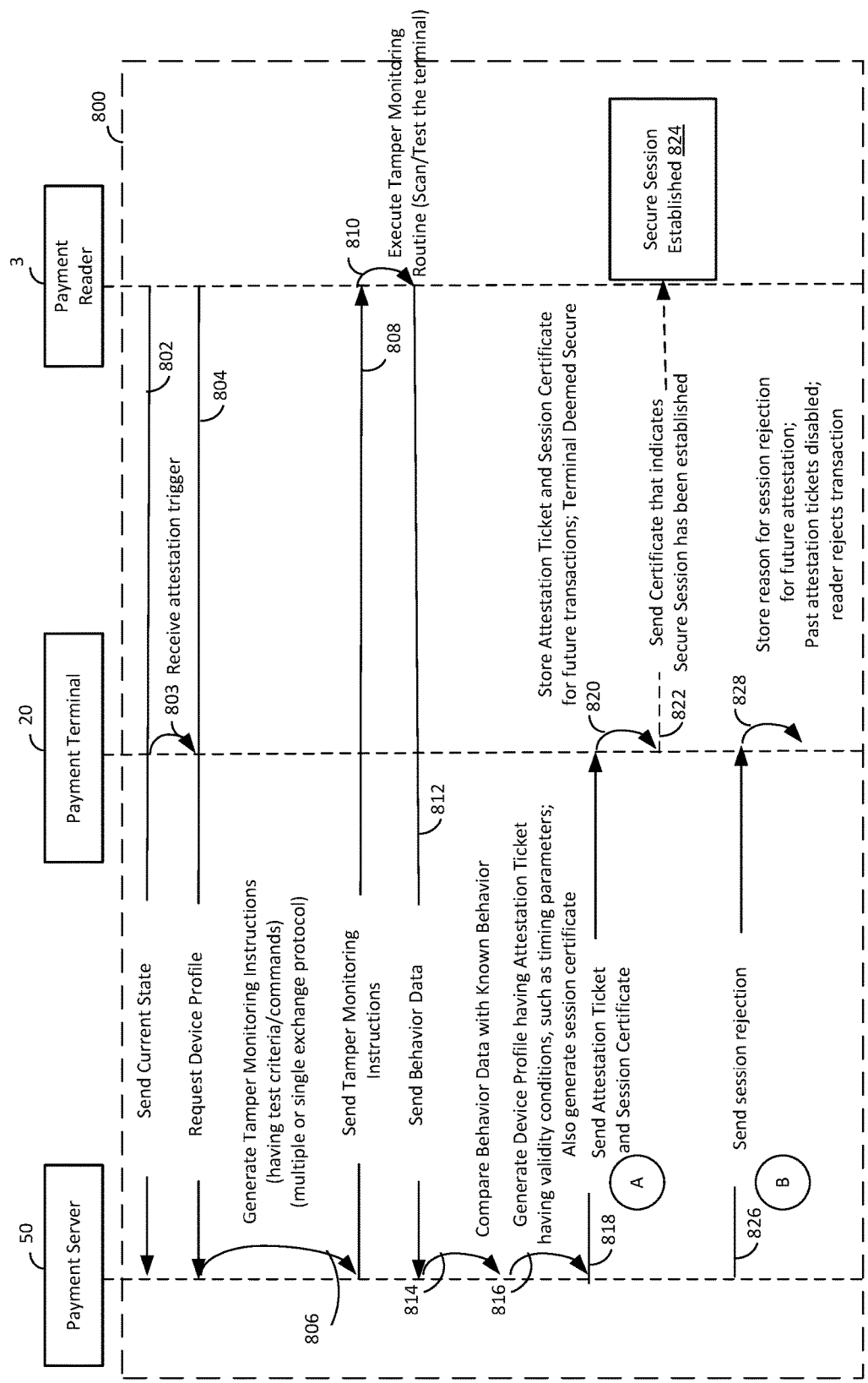
FIG. 8 conceptually illustrates an environment in which a card-based transaction is attested by use of the card reader with built-in tamper protection according to the technique introduced here.

FIG. 8 depicts a data flow 800 for generating an attestation ticket validating a payment terminal or any other merchant device belonging to the merchant and also for establishing a secure session between an attested terminal and a payment object reader based on a custom device profile, in accordance with some embodiments of the present disclosure. In one embodiment, as is depicted in FIG. 8, steps 800 are performed by a payment terminal device such as a payment reader 3, a payment terminal (also referred to as merchant device) 20, and payment server 50 (i.e., by payment processing system 50). Although these steps are described as being performed by particular devices in one embodiment, it will be understood that the allocation of the steps between the devices may be modified in any suitable manner or that the number of devices performing the steps may be modified in any suitable manner. Furthermore, method 800 can apply to a ticket being generated for the first time with no prior history of attestation tickets to the payment device's name, and also for devices requesting attestation tickets to be updated.

At step 802, the payment terminal 20, for example, the tamper monitoring component 70 periodically uploads data about state of the device on which it is installed (for example, environmental data, data from sensors, data from traces in a tamper mesh, hardware/OS details, signs of jailbreak or malware, device characteristics, etc.). The payment server 50 (for example, the tamper detection component 80) may receive and store that data. Collecting the state data allows the disclosed system to make better decisions about which platforms (application installs, devices, etc.) are trusted and secure and what conditions amount to tamper events and false positives. The state data also reveals all past ticket information, server's past decisions, whether the merchant has a good risk standing, any past indication of tampering or jail-breaking, transaction or merchant history and information related to that particular device or application. If this is the first time a device or application is requesting to be validated or attested, such data may not be available and as such the state data may be void. Therefore, for the purposes of this description, this step may occur either as first step or a step after attestation. In some cases, step 804 makes step 802 redundant and only one of the two is performed. In other cases, both steps are performed, where step 802 focuses on housekeeping and ensuring the state data is always up-to-date but an explicit request for attestation is not made, while step 804 triggers the process of generating an attestation ticket for validating a payment device. It will be understood that any number of devices, applications, operating platforms, merchants, and objects can be attested.

The tamper monitoring component 70 periodically checks in with payment server 50 and runs a thorough set of scans and tests on the payment terminal 20 to determine whether it is a candidate of a valid attestation ticket. This is also referred to as a "periodic scan". An example HTTP endpoint can be of the form "/frame/upload" to request for attestation routines and exchange data over encrypted channels. Here, frame refers to attestation data and routines. Besides, request for attestation ticket, the request can also include request for secure session validation. In some cases, the request for session validation can be sent after the ticket has been generated and received by the payment terminal 20. An example HTTP endpoint can be of the form "/session/validate." When a reader 3 is plugged in, the tamper monitoring component 70 runs a reduced set of checks, and then payment terminal's application 25 checks with server's tamper detection component 80 to confirm that it is allowed to communicate with the reader 3. This is explained subsequently.

For the purpose of explanation and clarity, the description hereinafter focuses on attesting a device, particularly payment terminal 20, which is executing a payment application 25 which interacts with the payment device or reader 10.

At step 803, the payment terminal 20 detects an attestation trigger. For example, the payment terminal 20 can detect an interaction between its communication port with a reader 3. Other examples of attestation trigger includes, but are not limited to, pairing a new reader to the POS terminal, installing a payment application to an unknown device, detecting re-location of the reader or the POS terminal to a new location, for example known to be fraudulent, detecting insertion of a card from a fraudulent user, detecting a fraudulent card, detecting entry of a fraudulent device within an established geo-fence, and so on. As such, the attestation ticket can attest not just the platform but also the environment, such as the location where the merchant store is, the customers or payment objects or payment devices (such as Apple Watch C)) that enter a geo-fence. Clearly, while some attestation triggers may be merchant driven, others are initiated by an event occurring around or with respect to the payment terminal 20.

At step 804, the payment terminal 20 may send a request to the payment server 40 requesting to facilitate generation of attestation ticket with a plugged-in reader 3. In response to an attestation trigger, for example, a reader 3 being plugged in, the payment terminal 20 generates a request for the payment server 50 to attest the payment terminal 20. Here, the "attestation trigger" is detection of connection with a reader 3, however the attestation triggers can vary or can be combination of several triggers. The tamper monitoring component 70 can send an attestation request (a) on startup, (b) whenever it has data to send, as shown in step 802, and (c) every few minutes; this gives server 50 regular opportunities to send new commands and attest as and when required.

In one implementation, the tamper monitoring component 70 can encrypt request for attestation ticket using keys under white-box cryptography. Additionally, or alternatively, the tamper monitoring component 70 can apply HTTPS encryption and authentication, which is used by all endpoints to encode the request. The tamper monitoring component 70 sends the attestation ticket request over an encrypted and obfuscated communication protocol, also referred to as attestation protocol, based for example on HTTP. Herein, every request or data originating from the tamper monitoring component 70 can be expressed in the form of 'frames.'

At step 806, the server 50 receives the attestation ticket request (encoded, for example) and determines whether there is any data associated with it, for example, state data indicating whether there is any historical data on which the server 50 can rely. Additionally, the data may include environmental factors, device identifiers, or merchant identifiers based on which the server 50 can determine whether there are any conditions associated with it. One of the condition may be "never attest in offline mode" or "attest if the merchant has a good standing," or attest if the merchant's account meets a certain criteria, and so on. Accordingly, the server 50 generates attestation routines for the terminal to execute. The attestation routines can include commands/test criteria or a single command that specify with granularity one or more anti-tamper checks, data collection scans, and/or tests, that tamper monitoring component 70 performs on the payment terminal 20. The policy of what commands are sent and under which circumstances can be encoded in tamper detection component 80. In one example, the attestation routines can be fixed such that regardless of what terminal is being tested the same routines are sent out, may be in different order. In other examples, the attestation routine can be based on the type of the terminal (iOS or Android), merchant profile, device profile, circumstances, and so on. In some cases, the order of commands in the routine can also be configured based on responses obtained from the tamper monitoring component 70. Therefore, the commands are sent in one after another, in a loop manner, so as to add unpredictability, in the flow. For example, the second command to the terminal 20 is configured based on how the terminal 20 responds to the first command. In some variations, the commands are low-level queries and commands, for example by using a scripting language.

At step 808, the server 50 sends the attestation routines to the reader 3. In some implementations, the request for an attestation ticket from tamper monitoring component 70 is followed by a response from Tamper detection component 80 in the form of commands or attestation routine. In some other cases, a routine or command from tamper detection component 80 is followed by a result from tamper monitoring component 70.

At step 810, the tamper monitoring component 70 executes the attestation routine, that involve, for example scanning or testing the terminal 20. The attestation routine when implemented on the terminal can cause, for example, hashing a portion of a software code, scanning memory of the payment terminal, checking for jail-breaking of the software code, gathering metadata of a mounted file system, and so on.

At step 812, the tamper monitoring component 70 obtains data corresponding to the routines, also called persistent data or behavior data, encodes as frames and sends it to the server 50 for further processing. Since tamper analysis component 80 is mostly stateless, the state and all events related to the terminal are saved on the client side and kept opaque in such that an attacker cannot access or make use of the data in any way. As mentioned above, at this time, the Tamper detection component 80 can request for additional information through more commands. As such steps 806-812 are repeated. Here, assume that only one cycle of commands is exchanged. The persisted data is written when tamper monitoring component 70 receives a "set_persisted_data" command from Tamper detection component 80. There can be a persisted data file, which Tamper monitoring component 70 overwrites each time.

An attacker cannot read, modify, or forge the persisted/attestation data because it is encrypted, but it can be deleted at any time. This makes it useful for storing "favorable" data, such as "this device passed this set of checks". In some cases, "unfavorable" data, such as "tampering was detected on this client", since an attacker can always delete it. However, some cases can save the unfavorable data such as "lastDenyTimestamp."

The persisted data can also be encrypted and authenticated using, e.g., AES-GCM with a 128-bit key. In one embodiment, encryption and decryption happen on the server side; as the attestation data is completely opaque to clients. All servers use the same key, which is stored and provided by a key-management system (not shown).

If tamper detection component 80 fails to decrypt the persisted data (e.g., because the MAC is bad), it discards it as if the protocol version had been out-of-date. The bad MAC can also be used as a signal of tampering.

At step 814, the server 50 compares encoded attestation data with known behavior or by basing it on reliably measured data collected over a population of payment platforms or pre-set values determined by security experts. If the data matches, the server 50 generates an attestation ticket validating that the terminal 50 is secure. If the data does not much, the ticket is denied and the tamper monitoring component 70 is notified. In this case, the tamper monitoring component 70 can re-submit the request after some time. As mentioned before, a ticket is a summary of the checks that have been run on a given device and that have returned successful or expected responses. It may include two types of information: timestamps and client identifiers. The timestamps indicate the last time a particular type of event occurred for a device and can track various types of events: "deny" and "approve". A "deny" can happen anytime tamper detection component 80 sees a command result indicating a problem. An "approve" happens when Tamper detection component 80 has no further commands to send and has not had a "deny" event. In one exemplary implementation, timestamps are in seconds past the epoch, using the server's clock.

Client identifiers are strings identifying a particular device. Tamper monitoring component 70 sends up a set of device identifiers with every frame; the exact set depends on the platform. "Device identifiers" to refer to the raw data that Tamper monitoring component 70 sends up, and "client identifiers" to refer to the set of features extracted by Tamper detection component 80. Client identifiers can also be extracted from the HTTP headers associated with tamper monitoring component 70's message (although these may be easier to tamper with).

Every frame tamper monitoring component 70 sends has a set of device identifiers. If the client has any persisted data, there will be a persisted_data message as well. Thus, tamper detection component 80 can always see Tamper monitoring component 70's previous ticket, if any. During the communications process, if tamper detection component 80 encounters an "approve" or "deny" event, it updates the current ticket and sends to back to the client with a 'set_persisted_data' command. By the end of the communications process, tamper detection component 80 must have encountered at least of these two events: either it encountered a problem ("deny"), or it finished all of its checks with no problem ("approve").

At step 816, the tamper detection component 80 of server 50 (a companion of the tamper monitoring component 70) generates the attestation ticket. In other implementations, tamper detection component 80 receives encoded request for attestation ticket from tamper monitoring component 70 and then sends to another component within the server 50, for example crypto 95 for decoding and subsequently, generate tickets. This is further discussed in FIG. 8D. For this implementation, the tamper detection component 80 generates the attestation ticket, specifically for the terminal requesting the ticket. In some implementations, the tamper detection component 80 generates tickets only when the request, including state data and other data, when compared to the population of devices, indicates an anomaly. As an example, the ticket can be substantially of the form:

Accordingly, the tamper detection component 70 generates an attestation ticket as shown in step 816. In other implementations, the ticket is only generated in an approve scenario. The tamper detection component 80 can also apply validity conditions on the attestation ticket, besides expiration and duration of time. For example, the attestation ticket may only attest a portion of the terminal 20, for a certain application, or for a certain type or number of transactions and such conditions can be set on the ticket. The attestation ticket and the state/attestation data can be re-sent to the tamper detection component 70 as shown in step 818. At this step, using the data sent by the monitoring component, the server can also generate a session certificate to set up a secure session between the requesting device and a connected reader.

At step 820, the attestation data and/or ticket can be stored in a secure database, for example a Hadoop Distributed File System (HDFS). After incorporation of the attestation routine, the payment server 50 assigns the payment platform as trusted for a predetermined period of time and assigns an attestation ticket for all future interactions. Additionally, it can also generate a session certificate for establishing secure sessions. At the lapse of the time period, the attestation routine can be re-initialized and re-executed to attest the payment platform for the second time.

At step 822, the attestation ticket can also accompany a session certificate to indicate a session has been established and/or validated, in one embodiment. In another embodiment, a separate session certificate can be requested through a separate process described subsequently. When the user plugs in a reader 3, the validation process is initiated. Tamper monitoring component 70 role in this process is to run a smaller set of checks, then put together a frame containing (a) the results of those checks, (b) data identifying the device it's running, and (c) the data that was written by the last set_persisted_data command. This frame is attached to the session validation request and sent to Tamper detection component 80's session/validate endpoint.

When evaluating this session validation request, tamper detection component 80 decrypts the ticket and checks that (a) tamper monitoring component 70 performed the communications process recently, (b) no problems were found, and (c) the process was run on the same device that the current validation process is running on.

Along with its other checks at the time of attestation, tamper detection component 80 can also extract the ticket from the persisted data and attempt to validate a secure session for a connected reader or any future connections with other devices. Like other checks from tamper detection component 80, the ticket validation process is configurable. Any of the following reasons can cause a session to be denied: no ticket present; the ticket has no "lastApproveTimestamp"; the ticket has a "lastApproveTimestamp", but it may be far in the past; the ticket has a "lastDenyTimestamp"; the client identifiers in the ticket do not match the ones in the current frame; certain mandatory client identifiers are missing from the ticket, the reader may not be connected or connected right, the reader may be connected to the incorrect port, a fraudulent object, user or buyer device may be detected in a geo-fence and so on. If, however, the session cannot be validated as shown in step 826, the payment terminal can store the reason of denial in the ticket and update any component that may need updating as done in step 828.

In one implementation, a card reader with built-in tamper protection includes a processor; a card reader interface coupled to the processor, to read data from a payment card; a security component configured to control access to sensitive data stored within the card reader; a first conductive trace and a second conductive trace, each disposed within the card reader to facilitate detection of tampering that satisfies a tampering-induced condition; and a tamper monitoring component coupled to the first conductive trace and the second conductive trace, the tamper monitoring component configured to switch a mode on which the traces operate based on the operation desired of the trace. In a first mode, the first conductive trace or the second conductive trace detects a tampering-induced condition on the trace including a short circuit condition or an open circuit condition where the tamper monitoring component detects the tampering-induced condition as any change in voltage. Accordingly, the component outputs a signal to disable access to the sensitive data stored within the card reader in response to detecting a tampering-induced condition. In a second mode, the tamper monitoring component monitors (a) transient voltages over a period of time, (b) a voltage change more than a threshold, or (c) a voltage change that lasts more than a duration of time on either or both of the traces, where the transient voltages are caused by one or more changes in an environment in which the card reader operates, including changes in temperature, humidity, or pressure experienced by the card reader; and based on the transients monitored over time, the component generate a profile customized to the card reader, the profile indicates a new threshold different from the predetermined threshold used to detect the tampering-induced condition; and applies the new threshold on the first conductive trace to determine whether or not any tampering satisfies the tampering-induced condition. In some implementations, the tamper monitoring component does not trigger a tamper response while the trace is operating in a second mode, or the mode in which behavioral data is collected.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices, and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A card reader with built-in tamper protection, the card reader comprising:
   a processor;
   a card reader interface coupled to the processor, to read data from a payment card;
   a tamper monitoring component configured to:
      monitor voltage measurements on at least one conductive trace disposed within the card reader to facilitate detection of tampering;
      detect a tampering-induced condition as a change in voltage below a predetermined threshold resulting upon an attempt of tampering with the card reader; and
      output a signal to disable access to sensitive data stored within the card reader in response to detecting the tampering-induced condition; and
   one or more sensors configured to obtain the voltage measurements on the at least one conductive trace disposed within;
   wherein the tamper monitoring component is further configured to:
      monitor the voltage measurements obtained by the one or more sensors over time;
      identify a variation, over time, in the voltage measurements caused by one or more changes in an environment in which the card reader operates, the one or more changes in the environment comprising at least one of a change in temperature, humidity, or pressure experienced by the card reader;
      determine, based at least in part on the variation in the voltage measurements over time, a new threshold below which the change in voltage indicates a tampering-induced condition;
      generate a profile customized to the card reader, wherein the profile indicates the new threshold different from the predetermined threshold used to detect the tampering-induced condition; and
      apply the new threshold to determine whether or not any changes in voltage satisfy the tampering-induced condition.

2. The card reader of claim 1, wherein the processor executes instructions to:
   detect, via a radio frequency (RF) transceiver of the card reader, at least one communication device within a communication range of the card reader, wherein the communication range is based on a RF communication protocol;
   establish, as per the RF communication protocol, a communication channel between the card reader and the communication device;
   obtain, by the card reader, a profile of the communication device and variations in voltage measurements obtained for the communication device;
   compare the variations in voltage measurements obtained for the communication device with the variation in the voltage measurements of the card reader;
   determine, based at least in part on the profile customized to the card reader, whether the variations in the voltage measurements obtained for the communication device are capable of triggering the tampering-induced condition based on the new threshold; and
   configure the profile of the communication device to match the profile of the card reader.

3. The card reader of claim 1, further comprising a clock configured to provide timing signals, wherein the timing signals are configured to synchronize the detection of the tampering-induced condition and the monitoring of the voltage measurements obtained by the one or more sensors.

4. An electronic device comprising:
   a processor;
   one or more sensors configured to obtain measurements for at least one device characteristic of the electronic device over time; and
   a memory storing instructions which when executed by the processor cause the electronic device to perform operations including:
      determining that a change in the measurements for the at least one device characteristic satisfies a tamper condition which indicates tampering with the electronic device;
      determining that the change in the measurements for the at least one device characteristic was caused at least partly by a change in an environment of the electronic device; and
      modifying the tamper condition for the electronic device based at least in part on the change in the measurements.

5. The electronic device of claim 4, wherein:
   the at least one device characteristic is related to operational features or physical features of one or more components embedded in the electronic device;
   the change in the environment of the electronic device comprises a change in at least one of temperature, humidity, or pressure experienced by the electronic device; and
   the operations further including:
      based on the change in the measurements for the at least one device characteristic, generate a profile customized to the electronic device, wherein the profile indicates a threshold for satisfying the tamper condition.

6. The electronic device of claim 5, the at least one device characteristic comprises at least one of a physical location of the electronic device, timing parameters, radiated performance, wireless performance, quality of communication links, radio frequency response, transmission measurements, receiver measurements, or engineering tolerances.

7. The electronic device of claim 5, the instructions further cause the electronic device to perform operations including:
   detecting, via a radio frequency (RF) transceiver of the electronic device, at least one communication device within a communication range of the electronic device, wherein the communication range is based on a RF communication protocol;

establishing, as per the RF communication protocol, a communication channel between the electronic device and the communication device;

obtaining, by the electronic device, a profile of the communication device and variations in measurements for the at least one device characteristic specific to the communication device;

comparing the variations reported by the communication device with the change in the measurements for the at least one device characteristic of the electronic device; and configuring the profile of the electronic device to match the profile of the communication device.

8. The electronic device of claim 4, wherein the one or more sensors include at least one of an accelerometer, an antenna, a gyrometer, a temperature sensor, a pressure sensor, or a location sensor.

9. The electronic device of claim 4, wherein:
the one or more sensors obtain measurements for at least one of temperature, pressure, or humidity; and
determining that the change in the measurements for the at least one device characteristic was caused at least partly by a change in an environment of the electronic device comprises identifying a change in the measurements for the at least one of temperature, pressure, or humidity.

10. The electronic device of claim 4, wherein modifying the tamper condition is further based at least in part on the change in the environment reported by a cluster of devices, similar to the electronic device and in proximity to the electronic device.

11. The electronic device of claim 4, wherein the instructions further cause the electronic device to perform operating including configuring at least one conductor from a set of conductors originally configured to facilitate detection of the change in the measurements for the at least one device characteristic satisfying the tamper condition to now facilitate determining behavior of the at least one conductor in response to the change in the environment.

12. The electronic device of claim 11, wherein the configuring is based on data reported by other electronic devices in proximity to the electronic device.

13. The electronic device of claim 11, wherein the set of conductors includes a first conductor and a second conductor, wherein portions of the first and second conductors are interwoven with each other along an interior planar layer of the electronic device.

14. The electronic device of claim 13, further comprising a tamper monitoring component electrically connected to the first conductor, wherein the tamper monitoring component is configured to trigger a tamper response upon determining that the change in measurements satisfies the tamper condition on the first conductor, and wherein the tamper response includes disabling access to secure data stored in the electronic device.

15. The electronic device of claim 14, wherein the tamper monitoring component is electrically connected to the second conductor, wherein the tamper monitoring component is configured to monitor transients on the second conductor over a period of time, wherein the transients are caused by one or more changes in an environment in which the electronic device operates, including changes in temperature, humidity, or pressure experienced by the electronic device.

16. The electronic device of claim 4, further comprising a clock configured to provide timing signals, wherein the timing signals are configured to synchronize facilitating the determination that the change in measurements for the at least one device characteristic satisfies the tamper condition and determining of behavior of the electronic device in response to the change in the environment.

17. The electronic device of claim 16, wherein the timing signals are configured to cause the one or more sensors to collect data for determining behavior of the at least one device characteristic of the electronic device when the electronic device is first registered with a payment server.

18. The electronic device of claim 13, wherein the electronic device is a payment object reader, and the electronic device further includes:
a payment object reader interface coupled to the processor, to read data from a payment object in response to a payment transaction;
a communication interface, coupled to the processor, through which to communicate over a network with one or more devices;
a security component configured to control access to secure data stored within the electronic device, wherein the secure data is related to the payment transaction;
a battery to supply power to the security component;
a resistor through which to supply the power from the battery for use in tamper detection, the resistor having a first terminal coupled to the battery and a second terminal coupled to the set of conductors; and
a tamper monitoring component coupled to the first conductor and the second conductor, the tamper monitoring component configured to:
detect a tamper event associated with the set of conductors, wherein the tamper event includes a short circuit condition or an open circuit condition, and wherein the tamper monitoring component detects the tamper event as a change in voltage below a predetermined threshold, the change in voltage resulting from a drop in substantially all voltage of the battery across the resistor upon an attempt of tampering with the electronic device.

19. The electronic device of claim 4, wherein the instructions cause creation of a profile specific to the electronic device, and wherein the profile is based on the change in the measurements for the at least one device characteristic of the electronic device with respect to the change in the environment recorded by the one or more sensors.

20. The electronic device of claim 19, the instructions further causing the electronic device to perform operation comprising:
sending, to a payment processing system, data corresponding to the change in the measurements for the at least one device characteristic of the electronic device with respect to the change in the environment, wherein the payment processing system is configured to:
collate additional data received from the electronic device and devices similar to the electronic device, the devices similar to the electronic device being determined based on a location, a merchant category, and a type of business;
receive, a profile of the electronic device based on a trend analysis of the collated additional data, wherein the profile includes a dynamic tamper threshold for determining whether an event satisfies the tamper condition; and
save the profile in the electronic device.

21. A method of detecting tampering in an electronic device, the method comprising:
monitoring data collected by one or more sensors of the electronic device to determine that the electronic device changed from a first state to a second state, wherein the second state is associated with a tamper condition which triggers a tamper response;

determining that the electronic device changing from the first state to the second state was caused at least partly by a change in an environment of the electronic device; and based at least in part on determining that the change from the first state to the second state was caused at least partly by the change in the environment, creating a tamper profile specific to the electronic device to prevent triggering of the tamper response due to the change in the environment.

22. The method of claim 21, wherein the change in the environment is introduced due to a change in location temperature, pressure or humidity.

23. The method of claim 21, wherein the electronic device is a payment card reader configured to be coupled to a mobile device.

24. The method of claim 21, further comprising:

permitting an operation to be performed by the electronic device to process a payment transaction while the data collected by the one or more sensors is monitored to detect a change of state; and disabling the operation in response to detecting a tamper condition with the electronic device, wherein the tamper condition includes a change in voltage below a predetermined threshold, the change in voltage resulting from a drop in substantially all voltage of a battery across a resistor upon an attempt of tampering with the electronic device.

25. The method of claim 21, further comprising:

receiving data from one or more devices in proximity to the electronic device and recorded by respective sensors of the one or more devices, the data indicating false triggering of the tamper response in the one or more devices;

initializing the monitoring of the data collected by the one or more sensors of the electronic device after receiving the data from the one or more devices; and targeting, by the one or more sensors of the electronic device, one or more components within the electronic device to monitor for behavioral analysis based on the data received from the one or more devices.

26. The method of claim 25, further includes:

assigning a first conductor and a second conductor from amongst a set of conductors to facilitate detection of a tamper condition;

determining, based on the monitoring of the data collected by the one or more sensors, that the first conductor is susceptible to accidentally trigger the tamper response; and disabling the first conductor based on the determining that the first conductor is susceptible to accidently trigger the tamper response.

27. The method of claim 24, wherein the tamper condition is a short circuit condition detected as a drop in the voltage below a predetermined threshold, and the predetermined threshold is configured to a dynamic threshold based on the behavioral analysis based on the data.

28. The card reader of claim 1, wherein:

the one or more sensors are further configured to obtain measurements for at least one of temperature, humidity, or pressure in the environment; and the tamper monitoring component is further configured to identify, based at least in part on the measurements for the at least one of temperature, humidity, or pressure, a change in the least one of temperature, humidity, or pressure at a time corresponding to the variation in the voltage measurements being greater than a threshold variation.

* * * * *